United States Patent
Kennedy et al.

(10) Patent No.: US 10,144,858 B2
(45) Date of Patent: Dec. 4, 2018

(54) METHODS AND COMPOSITIONS INCLUDING A CURABLE RESIN AND ORGANOPHILICALLY-MODIFIED CLAY FOR SUBTERRANEAN OIL WELL APPLICATIONS

(71) Applicant: Halliburton Energy Services, Inc., Houston, TX (US)

(72) Inventors: Herron J. Kennedy, Boulder, CO (US); Paul Joseph Jones, Houston, TX (US); Lucas David Albrighton, Centennial, CO (US)

(73) Assignee: Halliburton Energy Seervices, Inc., Houston, TX (US)

( * ) Notice: Subject to any disclaimer, the term of this patent is extended or adjusted under 35 U.S.C. 154(b) by 0 days.

(21) Appl. No.: 15/505,578

(22) PCT Filed: Sep. 25, 2014

(86) PCT No.: PCT/US2014/057510
§ 371 (c)(1),
(2) Date: Feb. 21, 2017

(87) PCT Pub. No.: WO2016/048332
PCT Pub. Date: Mar. 31, 2016

(65) Prior Publication Data
US 2017/0247598 A1   Aug. 31, 2017

(51) Int. Cl.
*E21B 43/26* (2006.01)
*E21B 33/138* (2006.01)
(Continued)

(52) U.S. Cl.
CPC .............. *C09K 8/44* (2013.01); *C04B 24/425* (2013.01); *C04B 26/10* (2013.01); *C04B 26/14* (2013.01);
(Continued)

(58) Field of Classification Search
CPC ........ E21B 43/26; E21B 33/138; E21B 33/13; C09K 8/62
See application file for complete search history.

(56) References Cited

U.S. PATENT DOCUMENTS 3,794,585 A * 2/1974 Liddy ...................... C10M 5/00
508/144
4,101,474 A 7/1978 Copeland et al.
(Continued)

FOREIGN PATENT DOCUMENTS

EA   200971090 A1   6/2010
WO   2008147658 A1   12/2008

OTHER PUBLICATIONS

International Search Report and Written Opinion of PCT Application No. PCT/US2014/057510 dated May 29, 2015: pp. 1-14.
(Continued)

*Primary Examiner* — Catherine Loikith
(74) *Attorney, Agent, or Firm* — Chamberlain Hrdlicka

(57) ABSTRACT

Compositions including a curable resin and organophilically-modified clay for subterranean oil well applications and methods of using the same. A method of treating a subterranean formation including placing in a subterranean formation a curable composition that includes at least one of a curable organic resin and a thermosetting polymer. The curable composition also includes an organophilically-modified clay.

20 Claims, 4 Drawing Sheets

(51) Int. Cl.
*E21B 33/13* (2006.01)
*C09K 8/62* (2006.01)
*C09K 8/44* (2006.01)
*C04B 26/10* (2006.01)
*C04B 26/14* (2006.01)
*C04B 28/02* (2006.01)
*C09K 8/467* (2006.01)
*C09K 8/48* (2006.01)
*C04B 24/42* (2006.01)
*E21B 33/14* (2006.01)

(52) U.S. Cl.
CPC ............ *C04B 28/021* (2013.01); *C09K 8/467* (2013.01); *C09K 8/48* (2013.01); *C09K 8/62* (2013.01); *E21B 33/138* (2013.01); *E21B 33/14* (2013.01); *E21B 43/26* (2013.01); *C09K 2208/08* (2013.01); *C09K 2208/26* (2013.01); *C09K 2208/32* (2013.01)

(56) References Cited

U.S. PATENT DOCUMENTS

| | | | |
|---|---|---|---|
| 4,412,018 | A | 10/1983 | Finlayson et al. |
| 5,571,281 | A | 11/1996 | Allen |
| 5,962,553 | A | 10/1999 | Ellsworth |
| 6,461,423 | B1 | 10/2002 | Beall et al. |
| 6,683,122 | B1 | 1/2004 | Zilg et al. |
| 7,786,189 | B2 | 8/2010 | Maruo et al. |
| 2002/0022579 | A1 | 2/2002 | Griffith et al. |
| 2007/0249754 | A1* | 10/2007 | Lyu .................. C08K 5/19 523/200 |
| 2010/0326660 | A1 | 12/2010 | Ballard et al. |
| 2014/0374097 | A1* | 12/2014 | Morgan .............. C04B 28/02 166/293 |

OTHER PUBLICATIONS

Akelah et al., "Synthesis and Characterization of 'Epoxyphilic' Montmorillonites," Clay Minerals, 1994, vol. 29: pp. 169-178.

Singla et al., "Clay Modification by the Use of Organic Cations," Scientific Research, Green and Sustainable Chemistry, 2012, vol. 2: pp. 21-25, <http://dx,diu,irg/10.4236/gsc,2012.21004>.

Tcherbi-Narteh et al., Research Article 864141: "Effects of Surface Treatments of Montmorillonite Nanoclay on Cure Behavior of Diblycidyl Ether of Bisphenol A Eposy Resin," Journal of Nanoscience, 2013, vol. 2013: pp. 1-12, <http://dx.doi.org/10.1155/2013/864141>.

Danushevskiy et al. "3.2: Weighting Agents, Weighted Well Cements and Slurries," Reference Guide for Well Materials, Second edition revised and supplemented, Moscow, Nedra, 1987, pp. 122-127.

Kissounko et al. "Understanding the role of clay silicate nanoparticles with organic modifiers in thermal curing of cyanate ester resin," European Polymer Journal, 2008, vol. 44, pp. 2807-2819.

Wu et al. "Synergistic fire retardancy in layered-silicate nanocomposite combined with low-melting phenysiloxane glass," Journal of Fire Sciences, 2011, vol. 30, Issue 1, pp. 69-87.

* cited by examiner

US 10,144,858 B2

METHODS AND COMPOSITIONS INCLUDING A CURABLE RESIN AND ORGANOPHILICALLY-MODIFIED CLAY FOR SUBTERRANEAN OIL WELL APPLICATIONS

BACKGROUND

In the liquid state the rheological profile of curable resin systems such as epoxy resin systems can be described as Newtonian and having little or no yield point. For wellbore cementing applications, it is often desirable to add solids to these systems for density control and effective placement of the fluid in the wellbore, casing or annulus. Current approaches to control density avoid the use of larger particulates of weighting agent because these are harder to suspend, and instead rely on the addition of more easily suspended micron-sized particulate weighting agents. As a result, the options for weighting agents are limited.

BRIEF DESCRIPTION OF THE FIGURES

The drawings, which are not necessarily drawn to scale, illustrate generally, by way of example, but not by way of limitation, various embodiments discussed in the present document.

DETAILED DESCRIPTION OF THE INVENTION

Figure 1:
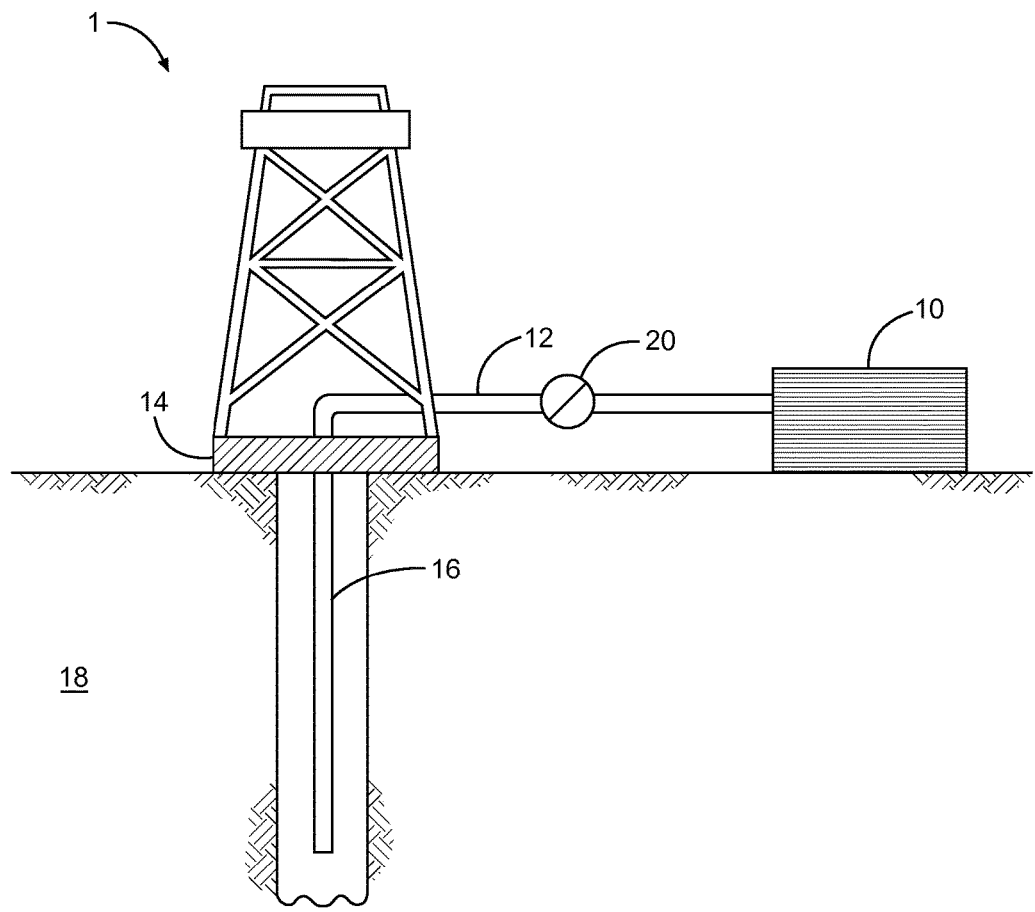
FIG. 1 illustrates a system or apparatus for delivering a composition to a subterranean formation, in accordance with various embodiments.

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

In the methods of manufacturing described herein, the acts can be carried out in any order without departing from the principles of the invention, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

Selected substituents within the compounds described herein are present to a recursive degree. In this context, "recursive substituent" means that a substituent may recite another instance of itself or of another substituent that itself recites the first substituent. Recursive substituents are an intended aspect of the disclosed subject matter. Because of the recursive nature of such substituents, theoretically, a large number may be present in any given claim. One of ordinary skill in the art of organic chemistry understands that the total number of such substituents is reasonably limited by the desired properties of the compound intended. Such properties include, by way of example and not limitation, physical properties such as molecular weight, solubility, and practical properties such as ease of synthesis. Recursive substituents can call back on themselves any suitable number of times, such as about 1 time, about 2 times, 3, 4, 5, 6, 7, 8, 9, 10, 15, 20, 30, 50, 100, 200, 300, 400, 500, 750, 1000, 1500, 2000, 3000, 4000, 5000, 10,000, 15,000, 20,000, 30,000, 50,000, 100,000, 200,000, 500,000, 750,000, or about 1,000,000 times or more.

The term "about" as used herein can allow for a degree of variability in a value or range, for example, within 10%, within 5%, or within 1% of a stated value or of a stated limit of a range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The term "organic group" as used herein refers to but is not limited to any carbon-containing functional group. For example, an oxygen-containing group such as an alkoxy group, aryloxy group, aralkyloxy group, oxo(carbonyl) group, a carboxyl group including a carboxylic acid, carboxylate, and a carboxylate ester; a sulfur-containing group such as an alkyl and aryl sulfide group; and other heteroatom-containing groups. Non-limiting examples of organic groups include OR, OOR, OC(O)N(R)$_2$, CN, CF$_3$, OCF$_3$, R, C(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, or C(=NOR)R, wherein R can be hydrogen (in examples that include other carbon atoms) or a carbon-based moiety, and wherein the carbon-based moiety can itself be further substituted.

The term "substituted" as used herein refers to an organic group as defined herein or molecule in which one or more hydrogen atoms contained therein are replaced by one or more non-hydrogen atoms. The term "functional group" or "substituent" as used herein refers to a group that can be or is substituted onto a molecule or onto an organic group. Examples of substituents or functional groups include, but are not limited to, a halogen (e.g., F, Cl, Br, and I); an oxygen atom in groups such as hydroxy groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxyamines, nitriles, nitro groups, N-oxides, hydrazides, azides, and enamines; and other heteroatoms in various other groups. Non-limiting examples of substituents J that can be bonded to a substituted carbon (or other) atom include F, Cl, Br, I, OR, OC(O)N(R)$_2$, CN, NO, NO$_2$, ONO$_2$, azido, CF$_3$, OCF$_3$, R, O (oxo), S (thiono), C(O), S(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, or C(=NOR)R, wherein R can be hydrogen or a carbon-based moiety, and wherein the carbon-based moiety can itself be further substituted; for example, wherein R can be hydrogen, alkyl, acyl, cycloalkyl, aryl, aralkyl, heterocyclyl, heteroaryl, or heteroarylalkyl, wherein any alkyl, acyl, cycloalkyl, aryl, aralkyl, heterocyclyl, heteroaryl, or heteroarylalkyl or R can be independently mono- or multi-substituted with J; or wherein two R groups bonded to a nitrogen atom or to adjacent nitrogen atoms can together with the nitrogen atom or atoms form a heterocyclyl, which can be mono- or independently multi-substituted with J.

The term "alkyl" as used herein refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "alkenyl" as used herein refers to straight and branched chain and cyclic alkyl groups as defined herein, except that at least one double bond exists between two carbon atoms. Thus, alkenyl groups have from 2 to 40 carbon atoms, or 2 to about 20 carbon atoms, or 2 to 12 carbons or, in some embodiments, from 2 to 8 carbon atoms. Examples include, but are not limited to vinyl, —CH=CH(CH$_3$), —CH=C(CH$_3$)$_2$, —C(CH$_3$)=CH$_2$, —C(CH$_3$)=CH(CH$_3$), —C(CH$_2$CH$_3$)=CH$_2$, cyclohexenyl, cyclopentenyl, cyclohexadienyl, butadienyl, pentadienyl, and hexadienyl among others.

The term "alkynyl" as used herein refers to straight and branched chain alkyl groups, except that at least one triple bond exists between two carbon atoms. Thus, alkynyl groups have from 2 to 40 carbon atoms, 2 to about 20 carbon atoms, or from 2 to 12 carbons or, in some embodiments, from 2 to 8 carbon atoms. Examples include, but are not limited to —C≡CH, —C≡C(CH$_3$), —C≡C(CH$_2$CH$_3$), —CH$_2$C≡CH, —CH$_2$C≡C(CH$_3$), and —CH$_2$C≡C(CH$_2$CH$_3$) among others.

The term "acyl" as used herein refers to a group containing a carbonyl moiety wherein the group is bonded via the carbonyl carbon atom. The carbonyl carbon atom is also bonded to another carbon atom, which can be part of an alkyl, aryl, aralkyl cycloalkyl, cycloalkylalkyl, heterocyclyl, heterocyclylalkyl, heteroaryl, heteroarylalkyl group or the like. In the special case wherein the carbonyl carbon atom is bonded to a hydrogen, the group is a "formyl" group, an acyl group as the term is defined herein. An acyl group can include 0 to about 12-20 or 12-40 additional carbon atoms bonded to the carbonyl group. An acyl group can include double or triple bonds within the meaning herein. An acryloyl group is an example of an acyl group. An acyl group can also include heteroatoms within the meaning here. A nicotinoyl group (pyridyl-3-carbonyl) is an example of an acyl group within the meaning herein. Other examples include acetyl, benzoyl, phenylacetyl, pyridylacetyl, cinnamoyl, and acryloyl groups and the like. When the group containing the carbon atom that is bonded to the carbonyl carbon atom contains a halogen, the group is termed a "haloacyl" group. An example is a trifluoroacetyl group.

The term "cycloalkyl" as used herein refers to cyclic alkyl groups such as, but not limited to, cyclopropyl, cyclobutyl, cyclopentyl, cyclohexyl, cycloheptyl, and cyclooctyl groups. In some embodiments, the cycloalkyl group can have 3 to about 8-12 ring members, whereas in other embodiments the number of ring carbon atoms range from 3 to 4, 5, 6, or 7. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups also include rings that are substituted with straight or branched chain alkyl groups as defined herein. Representative substituted cycloalkyl groups can be mono-substituted or substituted more than once, such as, but not limited to, 2,2-, 2,3-, 2,4- 2,5- or 2,6-disubstituted cyclohexyl groups or mono-, di- or tri-substituted norbornyl or cycloheptyl groups, which can be substituted with, for example, amino, hydroxy, cyano, carboxy, nitro, thio, alkoxy, and halogen groups. The term "cycloalkenyl" alone or in combination denotes a cyclic alkenyl group.

The term "aryl" as used herein refers to cyclic aromatic hydrocarbons that do not contain heteroatoms in the ring. Thus aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined herein. Representative substituted aryl groups can be mono-substituted or substituted more than once, such as, but not limited to, 2-, 3-, 4-, 5-, or 6-substituted phenyl or 2-8 substituted naphthyl groups, which can be substituted with carbon or non-carbon groups such as those listed herein.

The term "heterocyclyl" as used herein refers to aromatic and non-aromatic ring compounds containing three or more ring members, of which one or more is a heteroatom such as, but not limited to, N, O, and S.

The term "amine" as used herein refers to primary, secondary, and tertiary amines having, e.g., the formula N(group)$_3$ wherein each group can independently be H or non-H, such as alkyl, aryl, and the like. Amines include but are not limited to R—NH$_2$, for example, alkylamines, arylamines, alkylarylamines; R$_2$NH wherein each R is independently selected, such as dialkylamines, diarylamines, aralkylamines, heterocyclylamines and the like; and R$_3$N wherein each R is independently selected, such as trialkylamines, dialkylarylamines, alkyldiarylamines, triarylamines, and the like. The term "amine" also includes ammonium ions as used herein.

The term "amino group" as used herein refers to a substituent of the form —NH$_2$, —NHR, —NR$_2$, —NR$_3^+$, wherein each R is independently selected, and protonated forms of each, except for —NR$_3^+$, which cannot be protonated. Accordingly, any compound substituted with an amino group can be viewed as an amine. An "amino group" within the meaning herein can be a primary, secondary, tertiary, or quaternary amino group. An "alkylamino" group includes a monoalkylamino, dialkylamino, and trialkylamino group.

The terms "halo," "halogen," or "halide" group, as used herein, by themselves or as part of another substituent, mean, unless otherwise stated, a fluorine, chlorine, bromine, or iodine atom.

The term "haloalkyl" group, as used herein, includes mono-halo alkyl groups, poly-halo alkyl groups wherein all halo atoms can be the same or different, and per-halo alkyl groups, wherein all hydrogen atoms are replaced by halogen atoms, such as fluoro. Examples of haloalkyl include trifluoromethyl, 1,1-dichloroethyl, 1,2-dichloroethyl, 1,3-dibromo-3,3-difluoropropyl, perfluorobutyl, and the like.

The term "hydrocarbon" as used herein refers to a functional group or molecule that includes carbon and hydrogen atoms. The term can also refer to a functional group or molecule that normally includes both carbon and hydrogen atoms but wherein all the hydrogen atoms are substituted with other functional groups.

As used herein, the term "hydrocarbyl" refers to a functional group derived from a straight chain, branched, or cyclic hydrocarbon, and can be alkyl, alkenyl, alkynyl, aryl, cycloalkyl, acyl, or any combination thereof.

The term "solvent" as used herein refers to a liquid that can dissolve a solid, liquid, or gas. Nonlimiting examples of solvents are silicones, organic compounds, water, alcohols, ionic liquids, and supercritical fluids.

The term "room temperature" as used herein refers to a temperature of about 15° C. to 28° C.

The term "standard temperature and pressure" as used herein refers to 20° C. and 101 kPa.

As used herein, the term "polymer" refers to a molecule having at least one repeating unit and can include copolymers.

The term "copolymer" as used herein refers to a polymer that includes at least two different repeating units. A copolymer can include any suitable number of repeating units.

The term "downhole" as used herein refers to under the surface of the earth, such as a location within or fluidly connected to a wellbore.

As used herein, the term "drilling fluid" refers to fluids, slurries, or muds used in drilling operations downhole, such as during the formation of the wellbore.

As used herein, the term "stimulation fluid" refers to fluids or slurries used downhole during stimulation activities of the well that can increase the production of a well, including perforation activities. In some examples, a stimulation fluid can include a fracturing fluid or an acidizing fluid.

As used herein, the term "clean-up fluid" refers to fluids or slurries used downhole during clean-up activities of the well, such as any treatment to remove material obstructing the flow of desired material from the subterranean formation. In one example, a clean-up fluid can be an acidification treatment to remove material formed by one or more perforation treatments. In another example, a clean-up fluid can be used to remove a filter cake.

As used herein, the term "fracturing fluid" refers to fluids or slurries used downhole during fracturing operations.

As used herein, the term "spotting fluid" refers to fluids or slurries used downhole during spotting operations, and can be any fluid designed for localized treatment of a downhole region. In one example, a spotting fluid can include a lost circulation material for treatment of a specific section of the wellbore, such as to seal off fractures in the wellbore and prevent sag. In another example, a spotting fluid can include a water control material. In some examples, a spotting fluid can be designed to free a stuck piece of drilling or extraction equipment, can reduce torque and drag with drilling lubricants, prevent differential sticking, promote wellbore stability, and can help to control mud weight.

As used herein, the term "completion fluid" refers to fluids or slurries used downhole during the completion phase of a well, including cementing compositions.

As used herein, the term "remedial treatment fluid" refers to fluids or slurries used downhole for remedial treatment of a well. Remedial treatments can include treatments designed to increase or maintain the production rate of a well, such as stimulation or clean-up treatments.

As used herein, the term "abandonment fluid" refers to fluids or slurries used downhole during or preceding the abandonment phase of a well.

As used herein, the term "acidizing fluid" refers to fluids or slurries used downhole during acidizing treatments. In one example, an acidizing fluid is used in a clean-up operation to remove material obstructing the flow of desired material, such as material formed during a perforation operation. In some examples, an acidizing fluid can be used for damage removal.

As used herein, the term "cementing fluid" refers to fluids or slurries used during cementing operations of a well. For example, a cementing fluid can include an aqueous mixture including at least one of cement and cement kiln dust. In another example, a cementing fluid can include a curable resinous material such as a polymer that is in an at least partially uncured state.

As used herein, the term "water control material" refers to a solid or liquid material that interacts with aqueous material downhole, such that hydrophobic material can more easily travel to the surface and such that hydrophilic material (including water) can less easily travel to the surface. A water control material can be used to treat a well to cause the proportion of water produced to decrease and to cause the proportion of hydrocarbons produced to increase, such as by selectively binding together material between water-producing subterranean formations and the wellbore while still allowing hydrocarbon-producing formations to maintain output.

As used herein, the term "packer fluid" refers to fluids or slurries that can be placed in the annular region of a well between tubing and outer casing above a packer. In various examples, the packer fluid can provide hydrostatic pressure in order to lower differential pressure across the sealing element, lower differential pressure on the wellbore and casing to prevent collapse, and protect metals and elastomers from corrosion.

As used herein, the term "fluid" refers to liquids and gels, unless otherwise indicated.

As used herein, the term "subterranean material" or "subterranean formation" refers to any material under the surface of the earth, including under the surface of the bottom of the ocean. For example, a subterranean formation or material can be any section of a wellbore and any section of a subterranean petroleum- or water-producing formation or region in fluid contact with the wellbore. Placing a material in a subterranean formation can include contacting the material with any section of a wellbore or with any subterranean region in fluid contact therewith. Subterranean materials can include any materials placed into the wellbore such as cement, drill shafts, liners, tubing, casing, or screens; placing a material in a subterranean formation can include contacting with such subterranean materials. In some examples, a subterranean formation or material can be any below-ground region that can produce liquid or gaseous petroleum materials, water, or any section below-ground in fluid contact therewith. For example, a subterranean formation or material can be at least one of an area desired to be fractured, a fracture or an area surrounding a fracture, and a flow pathway or an area surrounding a flow pathway, wherein a fracture or a flow pathway can be optionally fluidly connected to a subterranean petroleum- or water-producing region, directly or through one or more fractures or flow pathways.

As used herein, "treatment of a subterranean formation" can include any activity directed to extraction of water or petroleum materials from a subterranean petroleum- or water-producing formation or region, for example, including drilling, stimulation, hydraulic fracturing, clean-up, acidizing, completion, cementing, remedial treatment, abandonment, and the like.

As used herein, a "flow pathway" downhole can include any suitable subterranean flow pathway through which two subterranean locations are in fluid connection. The flow pathway can be sufficient for petroleum or water to flow from one subterranean location to the wellbore or vice-versa. A flow pathway can include at least one of a hydraulic fracture, and a fluid connection across a screen, across gravel pack, across proppant, including across resin-bonded proppant or proppant deposited in a fracture, and across sand. A flow pathway can include a natural subterranean passageway through which fluids can flow. In some embodiments, a flow pathway can be a water source and can include water. In some embodiments, a flow pathway can be a petroleum source and can include petroleum. In some embodiments, a flow pathway can be sufficient to divert from a wellbore, fracture, or flow pathway connected thereto at least one of water, a downhole fluid, or a produced hydrocarbon.

As used herein, a "carrier fluid" refers to any suitable fluid for suspending, dissolving, mixing, or emulsifying with one or more materials to form a composition. For example, the carrier fluid can be at least one of crude oil, dipropylene glycol methyl ether, dipropylene glycol dimethyl ether, dipropylene glycol methyl ether, dipropylene glycol dimethyl ether, dimethyl formamide, diethylene glycol methyl ether, ethylene glycol butyl ether, diethylene glycol butyl ether, butylglycidyl ether, propylene carbonate, D-limonene, a $C_2$-$C_{40}$ fatty acid $C_1$-$C_{10}$ alkyl ester (e.g., a fatty acid methyl ester), tetrahydrofurfuryl methacrylate, tetrahydrofurfuryl acrylate, 2-butoxy ethanol, butyl acetate, butyl lactate, furfuryl acetate, dimethyl sulfoxide, dimethyl formamide, a petroleum distillation product of fraction (e.g., diesel, kerosene, napthas, and the like) mineral oil, a hydrocarbon oil, a hydrocarbon including an aromatic carbon-carbon bond (e.g., benzene, toluene), a hydrocarbon including an alpha olefin, xylenes, an ionic liquid, methyl ethyl ketone, an ester of oxalic, maleic or succinic acid, methanol, ethanol, propanol (iso- or normal-), butyl alcohol (iso-, tert-, or normal-), an aliphatic hydrocarbon (e.g., cyclohexanone, hexane), water, brine, produced water, flowback water, brackish water, and sea water. The fluid can form about 0.001 wt % to about 99.999 wt % of a composition, or a mixture including the same, or about 0.001 wt % or less, 0.01 wt %, 0.1, 1, 2, 3, 4, 5, 6, 8, 10, 15, 20, 25, 30, 35, 40, 45, 50, 55, 60, 65, 70, 75, 80, 85, 90, 95, 96, 97, 98, 99, 99.9, 99.99, or about 99.999 wt % or more.

In various embodiments, the present invention provides a method of treating a subterranean formation. The method includes placing in a subterranean formation a curable composition. The curable composition includes at least one of a curable organic resin and a thermosetting polymer. The curable composition also includes an organophilically-modified clay.

In various embodiments, the present invention provides a method of treating a subterranean formation. The method includes placing in a subterranean formation a curable composition including a curable epoxy resin and an organophilically-modified montmorillonite clay.

In various embodiments, the present invention provides a system including a curable composition. The curable composition includes at least one of a curable organic resin and a thermosetting polymer. The curable composition also includes an organophilically-modified clay. The system also includes a subterranean formation including the curable composition therein.

In various embodiments, the present invention provides a curable composition for treatment of a subterranean formation. The curable composition includes a curable epoxy resin and an organophilically-modified montmorillonite clay.

In various embodiments, the present invention provides a method of preparing a curable composition for treatment of a subterranean formation. The method includes forming a curable composition. The curable composition includes at least one of a curable organic resin and a thermosetting polymer. The curable composition also includes an organophilically-modified clay.

Various embodiments of the present invention provide certain advantages over other curable compositions and methods for using the same in subterranean formations. For example, suspending particles in curable compositions can be difficult due to the lack of a yield point or due to a low yield point. As a result, small particles are generally used, which are easier to suspend than larger particles. In contrast, various embodiments of the present invention provide a curable composition with rheological modification including from an organophilically-modified clay component, which provides a higher yield point than other curable compositions (which often have no yield point), allowing the suspension of larger particles. In various embodiments, the ability of the curable composition to suspend larger particles can provide enhanced options for the types of materials that can be suspended in curable resin compositions, such as weighting agents, proppants, or other materials.

In various embodiments, the curable composition can be easily densified by addition of additives with minimal risk of sedimentation during or after placement of the curable composition in a subterranean formation, providing a more effective curable composition for well control or providing better fluid displacement for isolation purposes. In various embodiments, the yield point of the curable composition can allow the curable composition to better maintain rheological hierarchy during pumping operations, for example, wherein the displacement fluid (e.g., the curable composition) maintains a higher yield point and plastic viscosity than the fluid that is being displaced. In various embodiments, the yield point of the curable composition can promote better fluid displacement, and can generate superior isolation and chemical or hydraulic sealing downhole. In various embodiments, the yield point of the curable composition can help to eliminate dynamic or static fluid inversion that occurs due to density differences of fluids within the wellbore caused by gravity. In various embodiments, the yield point of the curable composition can help the curable composition stay in place in the desired location, for example, until specific chemical reactions are completed to achieve a desired result. In various embodiments the yield point of the curable composition can prevent the settling of solids within the curable composition during mixing, pumping, and after placement when the system is in a static condition.

Method of Treating a Subterranean Formation.

In various embodiments, the present invention provides a method of treating a subterranean formation. The method can include placing in a subterranean formation a curable composition. The placing of the curable composition in the subterranean formation can include contacting the curable composition and any suitable part of the subterranean formation, or contacting the curable composition and a subterranean material, such as any suitable subterranean material. The subterranean formation can be any suitable subterranean formation. The curable composition can include a curable resin including at least one of a curable organic resin and a thermosetting polymer. The curable composition can include some components that are not curable, so long as the curable composition includes at least some components that are curable. The curable composition can include an organophilically-modified clay. The organophilically-modified clay and the curable resin can be substantially evenly mixed in the curable composition, such that the clay is approximately evenly distributed throughout the curable resin. The organophilically-modified clay can impart an initial shear stress or yield point (YP) to the curable composition to improve the suspension of solids and prevent or lessen settling of solid particulates during subterranean operations, such as a wellbore cementing process, a wellbore repair operation, a consolidation procedure, a remedial treatment procedure, an abandonment procedure, or a fracturing procedure.

In some embodiments, the placing of the curable composition in the subterranean formation includes contacting the curable composition with or placing the curable composition in at least one of a fracture, at least a part of an area surrounding a fracture, a flow pathway, an area surrounding a flow pathway, and an area desired to be fractured. The placing of the curable composition in the subterranean formation can be any suitable placing and can include any suitable contacting between the subterranean formation and the curable composition. The placing of the curable composition in the subterranean formation can include at least partially depositing the curable composition in a fracture, flow pathway, or area surrounding the same. In some embodiments, the method includes obtaining or providing the curable composition including the curable resin and the organophilically-modified clay. The obtaining or providing of the curable composition can occur at any suitable time and at any suitable location. The obtaining or providing of the curable composition can occur above the surface. The obtaining or providing of the curable composition can occur in the subterranean formation (e.g., downhole).

In various embodiments, the method includes cementing or repairing a wellbore in the subterranean formation. For example, the curable composition can be placed into an annulus between a casing and the wellbore, or between two casings, and can then be cured. In some embodiments, the curable composition can include cement, or can be placed adjacent to a cement composition. In some examples, the method can include placing the curable composition into a damaged region of a wellbore and then curing the curable composition. The curable composition can be used for any suitable type of cementing, such as primary cementing (e.g., initial cementing in the well, generally between casing and an annulus outside the casing), or such as secondary cementing (e.g., remedial cementing, such as due to loss of zonal isolation or loss of casing integrity).

In various embodiments, the method includes using the curable composition to perform an abandonment procedure in a well. The composition can be used in any suitable fashion during the abandonment. For example, the curable composition can be used to fill or seal the well, such as to fill or seal a casing.

In various embodiments, the method includes consolidating particulates downhole. For example, the method can include placing the curable composition into a region of the subterranean formation that includes fines, gravel, or other particles, and allowing the curable composition to cure such that the particles are substantially fixed in-place. In various embodiments, the method can include lost-circulation management, such as by placing the curable composition in a subterranean region experiencing fluid loss and curing the composition.

The method can include hydraulic fracturing, such as a method of hydraulic fracturing to generate a fracture or flow pathway. The placing of the curable composition in the subterranean formation or the contacting of the subterranean formation and the hydraulic fracturing can occur at any time with respect to one another; for example, the hydraulic fracturing can occur at least one of before, during, and after the contacting or placing. In some embodiments, the contacting or placing occurs during the hydraulic fracturing, such as during any suitable stage of the hydraulic fracturing, such as during at least one of a pre-pad stage (e.g., during injection of water with no proppant, and additionally optionally mid- to low-strength acid), a pad stage (e.g., during injection of fluid only with no proppant, with some viscosifier, such as to begin to break into an area and initiate fractures to produce sufficient penetration and width to allow proppant-laden later stages to enter), or a slurry stage of the fracturing (e.g., viscous fluid with proppant). The method can include performing a stimulation treatment at least one of before, during, and after placing the curable composition in the subterranean formation in the fracture, flow pathway, or area surrounding the same. The stimulation treatment can be, for example, at least one of perforating, acidizing, injecting of cleaning fluids, propellant stimulation, and hydraulic fracturing. In some embodiments, the stimulation treatment at least partially generates a fracture or flow pathway where the curable composition is placed or contacted, or the curable composition is placed or contacted to an area surrounding the generated fracture or flow pathway.

The curable composition can have any suitable yield point. As used herein, yield point refers to the amount of shear stress required to cause the curable composition to undergo plastic deformation or yield, wherein yielding occurs when the applied shear stress exceeds the yield point. For example, the curable composition can have a yield point that is about 1 lbf/100 ft$^2$ to about 10,000 lbf/100 ft$^2$, about 15 lbf/100 ft$^2$ to about 100 lbf/100 ft$^2$, about 1 lbf/100 ft$^2$ or less, or about 2 lbf/100 ft$^2$, 3, 4, 5, 6, 8, 10, 12, 14, 16, 18, 20, 25, 30, 35, 40, 45, 50, 55, 60, 65, 70, 75, 80, 85, 90, 95, 100, 150, 200, 250, 500, 750, 1,000, 1,500, 2,000, 2,500, 5,000, 7,500, or about 10,000 lbf/100 ft$^2$ or more.

The curable composition can have any suitable shear stress at a particular shear rate. For example, at about 10° C. to about 40° C. and standard pressure, at about 0.5 s$^{-1}$ to about 50 s$^{-1}$, the composition can have a shear stress of about 10 lbf/100 ft$^2$ to about 300 lbf/100 ft$^2$, about 40 lbf/100 ft$^2$ to about 220 lbf/100 ft$^2$, or about 10 lbf/100 ft$^2$ or less, or about 15 lbf/100 ft$^2$, 20, 25, 30, 35, 40, 45, 50, 55, 60, 65, 70, 75, 80, 90, 100, 110, 120, 130, 140, 150, 160, 170, 180, 190, 200, 210, 220, 230, 240, 250, 260, 270, 280, 290, or about 300 lbf/100 ft$^2$ or more. For example, at about 10° C. to about 40° C. and standard pressure, at about 50 s$^{-1}$ to about 200 s$^{-1}$, the composition can have a shear stress of about 100 lbf/100 ft$^2$ to about 1,000 lbf/100 ft$^2$, about 200 lbf/100 ft$^2$ to about 500 lbf/100 ft$^2$, or about 100 lbf/100 ft$^2$ or less, or about 110 lbf/100 ft$^2$, 120, 130, 140, 150, 160, 170, 180, 190, 200, 210, 220, 230, 240, 250, 260, 270, 280, 290, 300, 350, 400, 450, 500, 600, 700, 800, 900, or about 1,000 lbf/100 ft$^2$ or more. For example, at about 50° C. to about 100° C. and standard pressure, at about 0.5 to about 50 s$^{-1}$, the curable composition can have shear stress of about 10 lbf/100 ft$^2$ to about 100 lbf/100 ft$^2$, about 15 lbf/100 ft$^2$ to about 220 lbf/100 ft$^2$, about 10 lbf/100 ft$^2$ or less, or about 15 lbf/100 ft$^2$, 20, 25, 30, 35, 40, 45, 50, 55, 60, 65, 70, 75, 80, 85, 90, 95, or about 100 lbf/100 ft$^2$. For example, at about 50° C. to about 100° C. and standard pressure, at about 50 s to about 200 s$^{-1}$, the curable composition can have a shear stress of about 30 lbf/100 ft$^2$ to about 150 lbf/100 ft$^2$, about 50 lbf/100 ft$^2$ to about 200 lbf/100 ft$^2$, about 30 lbf/100 ft$^2$ or less, or about 35 lbf/100 ft$^2$, 40, 45, 50, 55, 60, 65, 70, 75, 80, 85, 90, 95, 100, 105, 110, 115, 120, 125, 130, 135, 140, 145, or about 150 lbf/100 ft$^2$. The method can include the use of any suitable shear rate, such as about 0 s$^{-1}$ to about 5,000 s$^{-1}$, or about 10 s$^{-1}$ to about 1,500 s$^{-1}$.

The curable composition can have any suitable density. The curable composition can have a density of about 50 kg/m$^3$ to about 5,000 kg/m$^3$, about 200 kg/m$^3$ to about 3,000 kg/m$^3$, or about 50 kg/m$^3$ or less, or about 100 kg/m$^3$, 150, 200, 250, 300, 350, 400, 450, 500, 550, 600, 650, 700, 750, 800, 850, 900, 950, 1,000, 1,050, 1,100, 1,150, 1,200, 1,250, 1,300, 1,350, 1,400, 1,450, 1,500, 1,550, 1,600, 1,650, 1,700, 1,750, 1,800, 1,850, 1,900, 1,950, 2,000, 2,100, 2,200, 2,300, 2,400, 2,500, 2,600, 2,700, 2,800, 2,900, 3,000, 3,250, 3,500, 3,750, 4,000, 4,250, 4,500, 4,750, or about 5,000 kg/m$^3$ or more.

The curable composition or a mixture including the same can include a weighting agent. The weighting agent can be any suitable weighting agent. For example, the weighting agent can be at least one of calcium carbonate, aluminum oxide, awaruite, barium carbonate, barium oxide, barium sulfate, barite, calcium carbonate, calcium oxide, cenospheres, chromite, chromium oxide, copper, copper oxide, dolomite, galena, hausmannite, hematite, hollow glass microspheres, ilmenite, iron oxide, siderite, magnetite, magnesium oxide, manganese carbonate, manganese dioxide, manganese (IV) oxide, manganese oxide, manganese tetraoxide, manganese (II) oxide, manganese (III) oxide, molybdenum (IV) oxide, molybdenum oxide, molybdenum trioxide, Portland cement, pumice, pyrite, spherelite, siderite, silica, silver, tenorite, titania, titanium (II) oxide, titanium (III) oxide, titanium (IV) dioxide, zirconium oxide, zirconium silicate, zinc oxide, cement-kiln dust, unexpanded and expanded perlite, attapulgite, bentonite, zeolite, elastomers, sand, micronized polymers, waxes, polymer fibers, inorganic fibers and any combination thereof. The weighting agent can have any suitable density, such as about 50 kg/m$^3$ or less, or about 100 kg/m$^3$, 150, 200, 250, 300, 350, 400, 450, 500, 550, 600, 650, 700, 750, 800, 850, 900, 950, 1,000, 1,050, 1,100, 1,150, 1,200, 1,250, 1,300, 1,350, 1,400, 1,450, 1,500, 1,550, 1,600, 1,650, 1,700, 1,750, 1,800, 1,850, 1,900, 1,950, 2,000, 2,100, 2,200, 2,300, 2,400, 2,500, 2,600, 2,700, 2,800, 2,900, 3,000, 3,250, 3,500, 3,750, 4,000, 4,250, 4,500, 4,750, or about 5,000 kg/m$^3$ or more. The weighting agent can have any suitable particle size (e.g., the largest dimension of the particle), such as about 1 nm to about 10 mm, about 100 nm to about 5 mm, about 300 nm to about 600 nm, or about 1 nm or less, about 5 nm, 10, 20, 25, 50, 75, 100, 150, 200, 250, 300, 400, 500, 600, 700, 800, 900 nm, 1 mm, 1.5, 2, 2.5, 3, 3.5, 4, 4.5, 5, 6, 7, 8, 9, or about 10 mm or more. The weighting agent can form any suitable proportion of the curable composition or a mixture including the same, such as about 0.001 wt % to about 80 wt %, about 0.01 wt % to about 50 wt %, about 1 wt % to about 40 wt %, or about 0.001 wt % or less, or about 0.01 wt %, 0.1, 0.5, 1, 1.5, 2, 3, 4, 5, 6, 8, 10, 15, 20, 25, 30, 35, 40, 45, 50, 55, 60, 65, 70, 75, or about 80 wt % or more.

Curable Resin.

The curable composition includes a curable resin. The curable resin can include at least one of a curable organic resin and a thermosetting polymer. As used herein, "cure" refers to allowing to undergo a physical or chemical reaction that results in hardening or an increase in viscosity. Curing can be at least one of a polymerization reaction and a crosslinking reaction. The curable composition can be a hydrophobic curable composition. The curable resin or the curable composition can include multiple components, such as curing agent components (e.g., amines or anhydrides), polymerizable components (e.g., curable organic resins, such as epoxides), or initiator components. The one or more polymerizable components can form any suitable proportion of the curable composition or curable resin, such as about 1 wt % to about 99 wt %, about 5 wt % to about 95 wt %, about 40 wt % to about 90 wt %, about 1 wt % or less, or about 2, 3, 4, 5, 6, 8, 10, 12, 14, 15, 20, 25, 30, 35, 40, 45, 50, 55, 60, 65, 70, 75, 80, 85, 90, 92, 94, 96, 97, 98, or about 99 wt % or more. The one or more curing agent or initiator components of the curable composition or of the curable resin can form any suitable proportion of the curable composition, such as about 1 wt % to about 99 wt %, about 5 wt % to about 95 wt %, about 40 wt % to about 90 wt %, about 1 wt % or less, or about 2, 3, 4, 5, 6, 8, 10, 12, 14, 15, 20, 25, 30, 35, 40, 45, 50, 55, 60, 65, 70, 75, 80, 85, 90, 92, 94, 96, 97, 98, or about 99 wt % or more.

In various embodiments, the method includes curing the curable composition, to provide a cured product of the curable composition. The curing of the curable composition can occur at least partially above-surface, such that a partial curing occurs prior to placing the curable composition in the subterranean formation. The curing of the curable composition can occur at least partially in the subterranean formation, such that all or part of the curing occurs when the curable composition is downhole, such as when the curable composition is at a desired location downhole. Curing can occur for any suitable time, at any suitable temperature, and at any suitable pressure, such as for 10 minutes, 20, 30, 40, 50 minutes, 1 hour, 1.5, 2, 3, 4, 5, 6, 8, 10, 12, 14, 16, 18, 20, 22 hours, 1 day, 1.5, 2, 3, 4, 5, 6 days, 1 week, 1.5, 2, 3 weeks, or about 1 month or more, such as at about 0° C. to about 500° C., or about 20° C. to about 400° C., or about 0° C. or less, or about 10° C., 20, 25, 30, 35, 40, 45, 50, 60, 70, 80, 90, 100, 125, 150, 175, 200, 225, 250, 275, 300, 350, 400, 450, or about 500° C. or more.

Any suitable proportion of the curable composition or curable resin can be the curable organic resin, the thermosetting polymer, or a combination thereof, so long as the curable composition can be cured, such as about 1 wt % to about 99.99 wt %, about 30 wt % to about 98 wt %, about 50 wt % to about 95 wt %, or about 1 wt % or less, or about 2 wt %, 3, 4, 5, 6, 8, 10, 12, 14, 16, 18, 20, 25, 30, 35, 40, 45, 50, 55, 60, 65, 70, 75, 76, 78, 80, 82, 84, 86, 88, 90, 91, 92, 93, 94, 95, 96, 97, 98, 99, 99.9, or about 99.99 wt % or more.

The curable organic resin or thermosetting polymer can include at least one of a shellac, a polyamide, a silyl-modified polyamide, a polyester, a polycarbonate, a polycarbamate, a urethane, a natural resin, an epoxy-based resin (e.g., epoxy-amine or epoxy-anhydride), a furan-based resin, a phenolic-based resin, a urea-aldehyde resin, and a phenol-phenol formaldehyde-furfuryl alcohol resin. In some embodiments, the curable organic resin or thermosetting polymer can be at least one of bisphenol A diglycidyl ether resin, butoxymethyl butyl glycidyl ether resin, bisphenol A-epichlorohydrin resin, bisphenol F resin, and bisphenol S resin. In some embodiments, the curable organic resin or thermosetting polymer can be at least one of an acrylic acid polymer, an acrylic acid ester polymer, an acrylic acid homopolymer, an acrylic acid ester homopolymer, poly (methyl acrylate), poly(butyl acrylate), poly(2-ethylhexyl acrylate), an acrylic acid ester copolymer, a methacrylic acid derivative polymer, a methacrylic acid homopolymer, a methacrylic acid ester homopolymer, poly(methyl methacrylate), poly(butyl methacrylate), poly(2-ethylhexyl methacrylate), an acrylamidomethylpropane sulfonate polymer or copolymer or derivative thereof, and an acrylic acid/acrylamidomethylpropane sulfonate copolymer. In some embodiments, the curable organic resin or thermosetting polymer can include at least one of a trimer acid, a fatty acid, a fatty acid-derivative, maleic anhydride, acrylic acid, a polyester, a polycarbonate, a polycarbamate, an aldehyde, formaldehyde, a dialdehyde, glutaraldehyde, a hemiacetal, an aldehyde-releasing compound, a diacid halide, a dihalide, a dichloride, a dibromide, a polyacid anhydride, citric acid, an epoxide, furfuraldehyde, an aldehyde condensate, a silyl-modified polyamide, and a condensation reaction product of a polyacid and a polyamine.

In some embodiments, the curable composition, the curable organic resin, or the thermosetting polymer can include an amine-containing polymer. In some embodiments, the curable organic resin or thermosetting polymer can be hydrophobically-modified. In some embodiments, the curable organic resin or thermosetting polymer can include at least one of a polyamine (e.g., spermidine and spermine), a polyimine (e.g., poly(ethylene imine) and poly(propylene imine)), a polyamide, poly(2-(N,N-dimethylamino)ethyl methacrylate), poly(2-(N,N-diethylamino)ethyl methacrylate), poly(vinyl imidazole), and a copolymer including monomers of at least one of the foregoing and monomers of at least one non-amine-containing polymer such as of at least one of polyethylene, polypropylene, polyethylene oxide, polypropylene oxide, polyvinylpyridine, polyacrylic acid, polyacrylate, and polymethacrylate. The hydrophobic modification can be any suitable hydrophobic modification, such as at least one $(C_4-C_{30})$hydrocarbyl including at least one of a straight chain, a branched chain, an unsaturated C—C bond, an aryl group, and any combination thereof.

In some embodiments, the curable resin or curable composition can include a curing agent. The curing agent can be any suitable curing agent. For example, the curing agent can include at least one of an amine, an aromatic amine, an aliphatic amine, a cyclo-aliphatic amine, polyamines, an anhydride, amides, polyamides, a polyethyleneimine, piperidine, triethylamine, benzyldimethylamine, N,N-dimethylaminopyridine, 2-(N,N-dimethylaminomethyl)phenol, tris (dimethylaminomethyl)phenol, N-2-(aminoethyl)-3-aminopropyltrimethoxysilane, 3-glycidoxypropyltrimethoxysilane, n-beta-(aminoethyl)-gamma-aminopropyl trimethoxysilane, n-beta-(aminoethyl)-gamma-aminopropyl trimethoxysilane, piperazine, derivatives of piperazine (e.g., aminoethylpiperazine), pyrrole, imidazole, pyrazole, pyridine, pyrazine, pyrimidine, pyridazine, indolizine, isoindole, indole, indazole, purine, quinolizine, quinoline, isoquinoline, phthalazine, naphthyridine, quinoxaline, quinazoline, carbazole, carbazole, phenanthridine, acridine, phenathroline, phenazine, imidazolidine, phenoxazine, cinnoline, pyrrolidine, pyrroline, imidazoline, piperidine, indoline, isoindoline, quinuclindine, morpholine, azocine, azepine, 1,3,5-triazine, thiazole, pteridine, dihydroquinoline, hexamethyleneimine, indazole, 2-ethyl-4-methyl imidazole, 1,1,3-trichlorotrifluoroacetone, and combinations thereof. The curing agent can form any suitable wt % of the curable organic resin, thermosetting polymer, or curable composition, such as about 0.001 wt % to about 50 wt %, about 0.01 wt % to about 20 wt %, or about 0.001 wt % or less, or about 0.01 wt %, 1, 2, 3, 4, 5, 10, 15, 20, 25, 30, 35, 40, 45, or about 50 wt % or more.

In various embodiments, the curable organic resin includes at least one of an epoxy-amine resin (e.g, having an epoxide component and an amine component, such as an amine curing agent component) and an epoxy-anhydride resin (e.g., having an epoxy component and an anhydride component, such as an anhydride curing agent component). For example, the curable organic resin can include at least one epoxide component that is a polyepoxide-substituted mono- or poly$(C_5-C_{20})$aryl compound, wherein the $(C_5-C_{20})$ aryl is substituted or unsubstituted, wherein the polyepoxide-substituted mono- or poly$(C_5-C_{20})$aryl compound is any suitable proportion of the curable resin, such as about 10 wt % to about 95 wt %, about 60 wt % to about 90 wt %, about 10 wt % or less, or about 15, 20, 25, 30, 35, 40, 45, 50, 55, 60, 65, 70, 75, 80, 85, 90, or about 95 wt % or more. Herein, an epoxide-substituted or amine-substituted organic group wherein the organic group is substituted or unsubstituted can have the epoxide or amine substituted on any one of the substituents of the organic group or substituted directly on the organic group itself. The epoxide component can be a diepoxide-substituted phenyl$(C_1-C_{10})$hydrocarbylphenyl, wherein the phenyl and $(C_1-C_{10})$hydrocarbyl are each independently substituted or unsubstituted. The epoxide component can be a diglycidyl ether of bisphenol A (2-[[4-[2-[4-(oxiran-2-ylmethoxy)phenyl]propan-2-yl]phenoxy]methyl] oxirane).

The curable organic resin can include at least one epoxide component that is an epoxide-substituted $(C_1-C_{10})$hydrocarbyl compound, wherein the $(C_1-C_{10})$hydrocarbyl can be independently substituted or unsubstituted, wherein the epoxide-substituted $(C_1-C_{10})$hydrocarbyl compound is any suitable proportion of the curable resin, such as about 5 wt % to about 60 wt %, 10 wt % to about 30 wt %, or about 5 wt % or less, or about 10 wt %, 15, 20, 25, 30, 35, 40, 45, 50, 55, or about 60 wt % or more. In some embodiments, the epoxide component can be a $(C_1\text{-}C_{10})$hydrocarbylglycidyl ether, such as butyl glycidyl ether.

The curable organic resin can include at least one epoxide component that is a polyepoxide-substituted $(C_5\text{-}C_{20})$cycloalkyl compound, wherein the $(C_5\text{-}C_{20})$cycloalkyl is substituted or unsubstituted, wherein the polyepoxide-substituted $(C_5\text{-}C_{20})$cycloalkyl compound is any suitable proportion of the curable resin, such as about 5 wt % to about 60 wt %, about 10 wt % to about 30 wt %, or about 5 wt % or less, or about 10 wt %, 15, 20, 25, 30, 35, 40, 45, 50, 55, or about 60 wt % or more. The epoxide component can be cyclohexanedimethanol diglycidyl ether. In various embodiments, the resin includes a combination of a polyepoxide-substituted $(C_5\text{-}C_{20})$cycloalkyl compound and a polyepoxide-substituted mono- or poly$(C_5\text{-}C_{20})$aryl compound, such as a combination of cyclohexanedimethanol diglycidyl ether and diglycidyl ether of bisphenol A. In some embodiments, the resin includes a combination of a polyepoxide-substituted $(C_5\text{-}C_{20})$cycloalkyl compound, a polyepoxide-substituted mono- or poly$(C_5\text{-}C_{20})$aryl compound, and an epoxide-substituted $(C_1\text{-}C_{10})$hydrocarbyl compound, such as a combination of cyclohexanedimethanol diglycidyl ether, diglycidyl ether of bisphenol A, and butyl glycidyl ether.

The curable organic resin or curable composition can include at least one amine component that is a polyamine-substituted $(C_1\text{-}C_{30})$hydrocarbyl, wherein the $(C_1\text{-}C_{30})$hydrocarbyl and each amine are independently substituted or unsubstituted, in any suitable proportion of the curable composition, such as about 5 wt % to about 50 wt %, about 10 wt % to about 30 wt %, about 5 wt % or less, or about 10 wt %, 15, 20, 25, 30, 35, 40, 45, or about 50 wt % or more. The amine component can be a bis(amino$(C_0\text{-}C_5)$hydrocarbyl)$(C_6\text{-}C_{20})$aryl compound, wherein the $(C_6\text{-}C_{20})$aryl, $(C_0\text{-}C_5)$hydrocarbyl, and each amine are each independently substituted or unsubstituted. The amine component can be diethyltoluenediamine. The curable organic resin or curable composition can include at least one amine component that is a polyamine-substituted poly$((C_2\text{-}C_5)$hydrocarbyloxy), wherein each $(C_2\text{-}C_5)$hydrocarbyloxy and each amine are independently substituted or unsubstituted. The amine component can be polyoxypropylene diamine. The curable organic resin or curable composition can include an amine component that is a mono- or polyamino$(C_0\text{-}C_{10})$hydrocarbyl$(C_6\text{-}C_{20})$aryl, wherein the $(C_0\text{-}C_{10})$hydrocarbyl, $(C_6\text{-}C_{20})$aryl, and each amine are each independently substituted or unsubstituted. The amine component can be a tris(amino$(C_1\text{-}C_3)$hydrocarbyl)benzene, wherein the $(C_1\text{-}C_3)$hydrocarbyl, the benzene, and each amine are independently substituted or unsubstituted. The amine component can be 2,4,6-tris(dimethylaminomethyl)phenol.

The curable resin or curable composition can include an anhydride component, such as an anhydride curing agent. The anhydride can be any suitable compound that includes an anhydride moiety and that can function as a curing agent with a curable organic resin in the curable composition. The anhydride component can be a maleic anhydride or a succinic anhydride that is fused with a substituted or unsubstituted $(C_5\text{-}C_{20})$hydrocarbon ring, or a plurality of said fused maleic or succinic anhydrides linked together via a substituted or unsubstituted $(C_0\text{-}C_{30})$hydrocarbyl interrupted by 0, 1, 2, or 3 oxygen atoms. For example, the anhydride can be an aromatic anhydride such as a 3,3',4,4'-phenyltetracarboxylic anhydride or multiple such molecules linked together at any suitable position via a $C_0\text{-}C_{30}$ substituted or unsubstituted hydrocarbyl linker optionally interrupted by 0-3 oxygen atoms, such as bisphenol A dianhydride (BPADA, 2,2-bis[4-(3,4-dicarboxyphenoxy)phenyl]propane dianhydride), biphenyl dianhydride (BPDA, 3,3',4,4'-biphenyltetracarboxylic dianhydride), or benzophenone-3,3',4,4'-tetracarboxylic dianhydride. For example, the anhydride can be a five-membered cyclic anhydride fused with another ring (e.g., a maleic or succinic anhydride fused to a $C_5\text{-}C_{10}$ aliphatic or aromatic substituted or unsubstituted ring), such as methyl-5-norbornene-2,3-dicarboxylic anhydride, methyltetrahydrophthalic anhydride, or methylhexahydrophthalic anhydride. The anhydride component can form any suitable wt % of the curable resin, or curable composition, such as about 0.001 wt % to about 50 wt %, about 0.01 wt % to about 20 wt %, or about 0.001 wt % or less, or about 0.01 wt %, 1, 2, 3, 4, 5, 10, 15, 20, 25, 30, 35, 40, 45, or about 50 wt % or more.

Organophilically-Modified Clay.

The curable composition can include an organophilically-modified clay. The organophilically-modified clay can be any clay that has a hydrophilic character (e.g., an at least partially hydrophilic clay or a hydrophilic clay). In some embodiments, the method further include organophilically modifying a clay to provide the organophilically-modified clay, while in other embodiments the clay is modified prior to performance of the method. The organophilic modification can occur at least partially above-surface and can occur at least partially in the subterranean formation.

The organophilically-modified clay can be present in the curable composition at a concentration such that the curable composition has a higher yield point than a corresponding curable composition having substantially none of the organophilically-modified clay therein. Any suitable proportion of the curable composition can include the organophilically-modified clay, such as about 0.01 wt % to about 50 wt % of the curable composition, about 1 wt % to about 20 wt %, or about 0.01 wt % or less, or about 0.01, 1, 2, 3, 4, 5, 6, 8, 10, 12, 14, 16, 18, 20, 22, 24, 25, 30, 35, 40, 45, or about 50 wt % or more.

The organophilically-modified clay can include any suitable one or more clays. For example, the organophilically-modified clay can include at least one of a kaolinite (e.g., kaolinite, nacrite, dickite, and halloysite), montmorillonite (e.g., montmorillonite, montmorillonite-smectite, bentonite, saponite, nontronite, hectorite, or sauconite), an illite (e.g., illite, hydrobiotite, glauconite, bramallite), and chlorite (e.g., chlorite or chamosite). The organophilically-modified clay can include vermiculite, attapulgite, or sepiolite. Other mineral components may further be associated with the clay. In some embodiments, the organophilically-modified clay includes montmorillonite.

The organophilic-modification of the clay can be any suitable organophilic modification that renders the clay more hydrophilic than a corresponding clay not having the organophilic modification or having less of the organophilic modification. The organophilic modification can be a surface modification, or a modification that occurs in non-surface regions as well. The organophilic modification can be an ion exchange with cationic surfactants having hydrophobic or organophilic groups. The organophilic modification can be an electrostatic attachment of the surfactant. The organophilic modification can be at least one of cationic substitution, physisorption (e.g., substantially no change in bonds), and chemisorption (e.g., change in bonds). A cation can replace other cations in the clay to form the organophilic modification. An anion can coordinate to one or more cations in the clay to form the organophilic modification.

The organophilically-modified clay can include at least one organophilic-modification compound or an ion thereof (e.g., the organophilic modification compound is a salt or a pair of ions that form a charge-neutral compound and the clay includes at least one ion from the salt). The at least one organophilic-modification compound or ion thereof can be any suitable proportion of the organophilically-modified clay, such as about 0.01 wt % to about 80 wt % of the organophilically-modified clay, or about 10 wt % to about 50 wt %, or about 0.01 wt % or less, or about 0.1 wt %, 1, 2, 3, 4, 5, 6, 8, 10, 12, 14, 16, 18, 20, 25, 30, 35, 40, 45, 50, 55, 60, 65, 70, 75, or about 80 wt % or more.

In various embodiments, the organophilic-modification compound is at least one of a substituted or unsubstituted ($C_{10}$-$C_{50}$) fatty acid or a salt thereof, a tri- or tetra-($C_1$-$C_{50}$) hydrocarbylammonium salt, and a tri- or tetra-($C_1$-$C_{50}$) hydrocarbylphosphonium salt, wherein each ($C_1$-$C_{50}$)hydrocarbyl is independently selected, is substituted or unsubstituted, and is interrupted by 0, 1, 2, or 3 atoms chosen from —O—, —S—, and substituted or unsubstituted —NH—.

The organophilic-modification compound can include a ($C_{10}$-$C_{50}$) fatty acid salt, such as magnesium stearate and zinc stearate. The organophilic-modification compound can include at least one of a tri- or tetra-($C_1$-$C_{50}$)hydrocarbylammonium salt, and a tri- or tetra-($C_1$-$C_{50}$)alkyl- or alkenylphosphonium salt, wherein each ($C_1$-$C_{50}$)hydrocarbyl is independently selected. The organophilic-modification compound can include at least one of a trimethyl stearyl ammonium salt, dodecyltrimethylammonium bromide, hexadecyltrimethylammonium bromide, tetradecyltrimethylammonium bromide, and tetraphenylphosphonium bromide.

The organophilically-modified clay can have any suitable density. For example, the organophilically-modified clay can have a density of about 50 kg/m³ to about 5,000 kg/m³, or about 200 kg/m³ to about 500 kg/m³, or about 50 kg/m³ or less, or about 100 kg/m³, 150, 200, 250, 300, 350, 400, 450, 500, 550, 600, 650, 700, 750, 800, 850, 900, 950, 1,000, 1,050, 1,100, 1,150, 1,200, 1,250, 1,300, 1,350, 1,400, 1,450, 1,500, 1,550, 1,600, 1,650, 1,700, 1,750, 1,800, 1,850, 1,900, 1,950, 2,000, 2,100, 2,200, 2,300, 2,400, 2,500, 2,600, 2,700, 2,800, 2,900, 3,000, 3,100, 3,200, 3,300, 3,400, 3,500, 3,600, 3,700, 3,800, 3,900, 4,000, 4,250, 4,500, 4,750, or about 5,000 kg/m³ or more.

The organophilically-modified clay can have any suitable particle size (e.g., largest dimension of the particle), such as 1 nm to about 10 mm, about 100 nm to about 5 mm, about 300 nm to about 600 nm, or about 1 nm or less, about 5 nm, 10, 20, 25, 50, 75, 100, 150, 200, 250, 300, 400, 500, 600, 700, 800, 900 nm, 1 mm, 1.5, 2, 2.5, 3, 3.5, 4, 4.5, 5, 6, 7, 8, 9, or about 10 mm or more.

For salts described herein, a positively charged counterion (e.g., in a fatty acid salt) can be any suitable positively charged countion, such as ammonium ($NH_4^+$), or an alkali metal such as sodium ($Na^+$), potassium ($K^+$), or lithium ($Li^+$). In some embodiments, the counterion can have a positive charge greater than +1, which can in some embodiments complex to multiple ionized groups, such as $Zn^{2+}$, $Al^{3+}$, or alkaline earth metals such as $Ca^{2+}$ or $Mg^{2+}$.

In various embodiments, a negatively charged counterion (e.g., in an ammonium salt with a hydrophobic ammonium ion) can be any suitable negatively charged counterion, such as a halide (e.g., fluoride, chloride, iodide, or bromide), nitrate, hydrogen sulfate, dihydrogen phosphate, bicarbonate, nitrite, perchlorate, iodate, chlorate, bromate, chlorite, hypochlorite, hypobromite, cyanide, amide, cyanate, hydroxide, permanganate, a conjugate base of any carboxylic acid (e.g., acetate or formate). In some embodiments, a counterion can have a negative charge greater than −1, which can in some embodiments complex to multiple ionized groups, such as oxide, sulfide, nitride, arsenate, phosphate, arsenite, hydrogen phosphate, sulfate, thiosulfate, sulfite, carbonate, chromate, dichromate, peroxide, or oxalate.

Other Components.

The curable composition including the curable resin and the organophilically-modified clay or a mixture including the curable composition, can include any suitable additional component in any suitable proportion, such that the curable composition or mixture including the same can be used as described herein.

In some embodiments, the curable composition includes one or more viscosifiers. The viscosifier can be any suitable viscosifier. The viscosifier can affect the viscosity of the curable composition or a solvent that contacts the curable composition at any suitable time and location. In some embodiments, the viscosifier provides an increased viscosity at least one of before injection into the subterranean formation, at the time of injection into the subterranean formation, during travel through a tubular disposed in a borehole, once the curable composition reaches a particular subterranean location, or some period of time after the curable composition reaches a particular subterranean location. In some embodiments, the viscosifier can be about 0.000.1 wt % to about 10 wt % of the curable composition or a mixture including the same, about 0.004 wt % to about 0.01 wt %, or about 0.000.1 wt % or less, 0.000.5 wt %, 0.001, 0.005, 0.01, 0.05, 0.1, 0.5, 1, 2, 3, 4, 5, 6, 7, 8, 9, or about 10 wt % or more of the curable composition or a mixture including the same.

The viscosifier can include at least one of a substituted or unsubstituted polysaccharide, and a substituted or unsubstituted polyalkene (e.g., a polyethylene, wherein the ethylene unit is substituted or unsubstituted, derived from the corresponding substituted or unsubstituted ethene), wherein the polysaccharide or polyalkene is crosslinked or uncrosslinked. The viscosifier can include a polymer including at least one repeating unit derived from a monomer selected from the group consisting of ethylene glycol, acrylamide, vinyl acetate, 2-acrylamidomethylpropane sulfonic acid or its salts, trimethylammoniumethyl acrylate halide, and trimethylammoniumethyl methacrylate halide. The viscosifier can include a crosslinked gel or a crosslinkable gel. The viscosifier can include at least one of a linear polysaccharide, and a poly(($C_2$-$C_{10}$)alkene), wherein the ($C_2$-$C_{10}$) alkene is substituted or unsubstituted. The viscosifier can include at least one of poly(acrylic acid) or ($C_1$-$C_5$)alkyl esters thereof, poly(methacrylic acid) or ($C_1$-$C_5$)alkyl esters thereof, poly(vinyl acetate), poly(vinyl alcohol), poly(ethylene glycol), poly(vinyl pyrrolidone), polyacrylamide, poly (hydroxyethyl methacrylate), alginate, chitosan, curdlan, dextran, emulsan, a galactoglucopolysaccharide, gellan, glucuronan, N-acetyl-glucosamine, N-acetyl-heparosan, hyaluronic acid, kefiran, lentinan, levan, mauran, pullulan, scleroglucan, schizophyllan, stewartan, succinoglycan, xanthan, diutan, welan, derivatized starch, tamarind, tragacanth, guar gum, derivatized guar (e.g., hydroxypropyl guar, carboxy methyl guar, or carboxymethyl hydroxypropyl guar), gum ghatti, gum arabic, locust bean gum, and derivatized cellulose (e.g., carboxymethyl cellulose, hydroxyethyl cellulose, carboxymethyl hydroxyethyl cellulose, hydroxypropyl cellulose, or methyl hydroxy ethyl cellulose).

In some embodiments, the viscosifier can include at least one of a poly(vinyl alcohol) homopolymer, poly(vinyl alcohol) copolymer, a crosslinked poly(vinyl alcohol) homopolymer, and a crosslinked poly(vinyl alcohol) copolymer. The viscosifier can include a poly(vinyl alcohol) copolymer or a crosslinked poly(vinyl alcohol) copolymer including at least one of a graft, linear, branched, block, and random copolymer of vinyl alcohol and at least one of a substituted or unsubstituted $(C_2-C_{50})$hydrocarbyl having at least one aliphatic unsaturated C—C bond therein, and a substituted or unsubstituted $(C_2-C_{50})$alkene. The viscosifier can include a poly(vinyl alcohol) copolymer or a crosslinked poly(vinyl alcohol) copolymer including at least one of a graft, linear, branched, block, and random copolymer of vinyl alcohol and at least one of vinyl phosphonic acid, vinylidene diphosphonic acid, substituted or unsubstituted 2-acrylamido-2-methylpropanesulfonic acid, a substituted or unsubstituted $(C_1-C_{20})$alkenoic acid, propenoic acid, butenoic acid, pentenoic acid, hexenoic acid, octenoic acid, nonenoic acid, decenoic acid, acrylic acid, methacrylic acid, hydroxypropyl acrylic acid, acrylamide, fumaric acid, methacrylic acid, hydroxypropyl acrylic acid, vinyl phosphonic acid, vinylidene diphosphonic acid, itaconic acid, crotonic acid, mesoconic acid, citraconic acid, styrene sulfonic acid, allyl sulfonic acid, methallyl sulfonic acid, vinyl sulfonic acid, and a substituted or unsubstituted $(C_1-C_{20})$alkyl ester thereof. The viscosifier can include a poly(vinyl alcohol) copolymer or a crosslinked poly(vinyl alcohol) copolymer including at least one of a graft, linear, branched, block, and random copolymer of vinyl alcohol and at least one of vinyl acetate, vinyl propanoate, vinyl butanoate, vinyl pentanoate, vinyl hexanoate, vinyl 2-methyl butanoate, vinyl 3-ethylpentanoate, and vinyl 3-ethylhexanoate, maleic anhydride, a substituted or unsubstituted $(C_1-C_{20})$alkenoic substituted or unsubstituted $(C_1-C_{20})$alkanoic anhydride, a substituted or unsubstituted $(C_1-C_{20})$alkenoic substituted or unsubstituted $(C_1-C_{20})$alkenoic anhydride, propenoic acid anhydride, butenoic acid anhydride, pentenoic acid anhydride, hexenoic acid anhydride, octenoic acid anhydride, nonenoic acid anhydride, decenoic acid anhydride, acrylic acid anhydride, fumaric acid anhydride, methacrylic acid anhydride, hydroxypropyl acrylic acid anhydride, vinyl phosphonic acid anhydride, vinylidene diphosphonic acid anhydride, itaconic acid anhydride, crotonic acid anhydride, mesoconic acid anhydride, citraconic acid anhydride, styrene sulfonic acid anhydride, allyl sulfonic acid anhydride, methallyl sulfonic acid anhydride, vinyl sulfonic acid anhydride, and an N—$(C_1-C_{10})$alkenyl nitrogen containing substituted or unsubstituted $(C_1-C_{10})$heterocycle. The viscosifier can include a poly(vinyl alcohol) copolymer or a crosslinked poly(vinyl alcohol) copolymer including at least one of a graft, linear, branched, block, and random copolymer that includes a poly(vinylalcohol/acrylamide) copolymer, a poly (vinylalcohol/2-acrylamido-2-methylpropanesulfonic acid) copolymer, a poly (acrylamide/2-acrylamido-2-methylpropanesulfonic acid) copolymer, or a poly(vinylalcohol/N-vinylpyrrolidone) copolymer. The viscosifier can include a crosslinked poly(vinyl alcohol) homopolymer or copolymer including a crosslinker including at least one of chromium, aluminum, antimony, zirconium, titanium, calcium, boron, iron, silicon, copper, zinc, magnesium, and an ion thereof. The viscosifier can include a crosslinked poly(vinyl alcohol) homopolymer or copolymer including a crosslinker including at least one of an aldehyde, an aldehyde-forming compound, a carboxylic acid or an ester thereof, a sulfonic acid or an ester thereof, a phosphonic acid or an ester thereof, an acid anhydride, and an epihalohydrin.

In various embodiments, the curable composition can include one or more crosslinkers. The crosslinker can be any suitable crosslinker. In some examples, the crosslinker can be incorporated in a crosslinked viscosifier, and in other examples, the crosslinker can crosslink a crosslinkable material (e.g., downhole). The crosslinker can include at least one of chromium, aluminum, antimony, zirconium, titanium, calcium, boron, iron, silicon, copper, zinc, magnesium, and an ion thereof. The crosslinker can include at least one of boric acid, borax, a borate, a $(C_1-C_{30})$hydrocarbylboronic acid, a $(C_1-C_{30})$hydrocarbyl ester of a $(C_1-C_{30})$hydrocarbylboronic acid, a $(C_1-C_{30})$hydrocarbylboronic acid-modified polyacrylamide, ferric chloride, disodium octaborate tetrahydrate, sodium metaborate, sodium diborate, sodium tetraborate, disodium tetraborate, a pentaborate, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, titanium acetylacetonate, aluminum lactate, and aluminum citrate. In some embodiments, the crosslinker can be a $(C_1-C_{20})$alkylenebiacrylamide (e.g., methylenebisacrylamide), a poly $((C_1-C_{20})$alkenyl)-substituted mono- or poly-$(C_1-C_{20})$alkyl ether (e.g., pentaerythritol allyl ether), and a poly$(C_2-C_{20})$ alkenylbenzene (e.g., divinylbenzene). In some embodiments, the crosslinker can be at least one of alkyl diacrylate, ethylene glycol diacrylate, ethylene glycol dimethacrylate, polyethylene glycol diacrylate, polyethylene glycol dimethacrylate, ethoxylated bisphenol A diacrylate, ethoxylated bisphenol A dimethacrylate, ethoxylated trimethylol propane triacrylate, ethoxylated trimethylol propane trimethacrylate, ethoxylated glyceryl triacrylate, ethoxylated glyceryl trimethacrylate, ethoxylated pentaerythritol tetraacrylate, ethoxylated pentaerythritol tetramethacrylate, ethoxylated dipentaerythritol hexaacrylate, polyglyceryl monoethylene oxide polyacrylate, polyglyceryl polyethylene glycol polyacrylate, dipentaerythritol hexaacrylate, dipentaerythritol hexamethacrylate, neopentyl glycol diacrylate, neopentyl glycol dimethacrylate, pentaerythritol triacrylate, pentaerythritol trimethacrylate, trimethylol propane triacrylate, trimethylol propane trimethacrylate, tricyclodecane dimethanol diacrylate, tricyclodecane dimethanol dimethacrylate, 1,6-hexanediol diacrylate, and 1,6-hexanediol dimethacrylate. The crosslinker can be about 0.000.01 wt % to about 5 wt % of the curable composition or a mixture including the same, about 0.001 wt % to about 0.01 wt %, or about 0.000.01 wt % or less, or about 0.000.05 wt %, 0.000, 1, 0.000, 5, 0.001, 0.005, 0.01, 0.05, 0.1, 0.5, 1, 2, 3, 4, or about 5 wt % or more.

In some embodiments, the curable composition can include one or more breakers. The breaker can be any suitable breaker, such that the surrounding fluid (e.g., a fracturing fluid) can be at least partially broken for more complete and more efficient recovery thereof, such as at the conclusion of the hydraulic fracturing treatment. In some embodiments, the breaker can be encapsulated or otherwise formulated to give a delayed-release or a time-release of the breaker, such that the surrounding liquid can remain viscous for a suitable amount of time prior to breaking. The breaker can be any suitable breaker; for example, the breaker can be a compound that includes a $Na^+$, $K^+$, $Li^+$, $Zn^+$, $NH_4^+$, $Fe^{2+}$, $Fe^{3+}$, $Cu^{1+}$, $Cu^{2+}$, $Ca^{2+}$, $Mg^{2+}$, $Zn^{2+}$, and an $Al^{3+}$ salt of a chloride, fluoride, bromide, phosphate, or sulfate ion. In some examples, the breaker can be an oxidative breaker or an enzymatic breaker. An oxidative breaker can be at least one of a $Na^+$, $K^+$, $Li^+$, $Zn^+$, $NH_4^+$, $Fe^{2+}$, $Fe^{3+}$, $Cu^{1+}$, $Cu^{2+}$, Ca$^{2+}$, Mg$^{2+}$, Zn$^{2+}$, and an Al$^{3+}$ salt of a persulfate, percarbonate, perborate, peroxide, perphosphate, permanganate, chlorite, or hyporchlorite ion. An enzymatic breaker can be at least one of an alpha or beta amylase, amyloglucosidase, oligoglucosidase, invertase, maltase, cellulase, hemicellulase, and mannanohydrolase. The breaker can be about 0.001 wt % to about 30 wt % of the curable composition or a mixture including the same, or about 0.01 wt % to about 5 wt %, or about 0.001 wt % or less, or about 0.005 wt %, 0.01, 0.05, 0.1, 0.5, 1, 2, 3, 4, 5, 6, 8, 10, 12, 14, 16, 18, 20, 22, 24, 26, 28, or about 30 wt % or more.

The curable composition, or a mixture including the curable composition, can include any suitable fluid. For example, the fluid can be at least one of crude oil, dipropylene glycol methyl ether, dipropylene glycol dimethyl ether, dipropylene glycol methyl ether, dipropylene glycol dimethyl ether, dimethyl formamide, diethylene glycol methyl ether, ethylene glycol butyl ether, diethylene glycol butyl ether, butylglycidyl ether, propylene carbonate, D-limonene, a C$_2$-C$_{40}$ fatty acid C$_1$-C$_{10}$ alkyl ester (e.g., a fatty acid methyl ester), tetrahydrofurfuryl methacrylate, tetrahydrofurfuryl acrylate, 2-butoxy ethanol, butyl acetate, butyl lactate, furfuryl acetate, dimethyl sulfoxide, dimethyl formamide, a petroleum distillation product of fraction (e.g., diesel, kerosene, napthas, and the like) mineral oil, a hydrocarbon oil, a hydrocarbon including an aromatic carbon-carbon bond (e.g., benzene, toluene), a hydrocarbon including an alpha olefin, xylenes, an ionic liquid, methyl ethyl ketone, an ester of oxalic, maleic or succinic acid, methanol, ethanol, propanol (iso- or normal-), butyl alcohol (iso-, tert-, or normal-), an aliphatic hydrocarbon (e.g., cyclohexanone, hexane), water, brine, produced water, flowback water, brackish water, and sea water. The fluid can form about 0.001 wt % to about 99.999 wt % of the curable composition, or a mixture including the same, or about 0.001 wt % or less, 0.01 wt %, 0.1, 1, 2, 3, 4, 5, 6, 8, 10, 15, 20, 25, 30, 35, 40, 45, 50, 55, 60, 65, 70, 75, 80, 85, 90, 95, 96, 97, 98, 99, 99.9, 99.99, or about 99.999 wt % or more.

The curable composition including the curable resin and the organophilically-modified clay or a mixture including the same can include any suitable downhole fluid. The curable composition including the curable resin and the organophilically-modified clay can be combined with any suitable downhole fluid before, during, or after the placement of the curable composition in the subterranean formation or the contacting of the curable composition and the subterranean material. In some examples, the curable composition including the curable resin and the organophilically-modified clay is combined with a downhole fluid above the surface, and then the combined composition is placed in a subterranean formation or contacted with a subterranean material. In another example, the curable composition including the curable resin and the organophilically-modified clay is injected into a subterranean formation to combine with a downhole fluid, and the combined composition is contacted with a subterranean material or is considered to be placed in the subterranean formation. The placement of the curable composition in the subterranean formation can include contacting the subterranean material and the mixture. Any suitable weight percent of the curable composition or of a mixture including the same that is placed in the subterranean formation or contacted with the subterranean material can be the downhole fluid, such as about 0.001 wt % to about 99.999 wt %, about 0.01 wt % to about 99.99 wt %, about 0.1 wt % to about 99.9 wt %, about 20 wt % to about 90 wt %, or about 0.001 wt % or less, or about 0.01 wt %, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99 wt %, or about 99.999 wt % or more of the curable composition or mixture including the same.

In some embodiments, the curable composition, or a mixture including the same, can include any suitable amount of any suitable material used in a downhole fluid. For example, the curable composition or a mixture including the same can include water, saline, aqueous base, acid, oil, organic solvent, synthetic fluid oil phase, aqueous solution, alcohol or polyol, cellulose, starch, alkalinity control agents, acidity control agents, density control agents, density modifiers, emulsifiers, dispersants, polymeric stabilizers, cross-linking agents, polyacrylamide, a polymer or combination of polymers, antioxidants, heat stabilizers, foam control agents, solvents, diluents, plasticizer, filler or inorganic particle, pigment, dye, precipitating agent, rheology modifier, oil-wetting agents, set retarding additives, surfactants, gases, weight reducing additives, heavy-weight additives, lost circulation materials, filtration control additives, salts (e.g., any suitable salt, such as potassium salts such as potassium chloride, potassium bromide, potassium formate; calcium salts such as calcium chloride, calcium bromide, calcium formate; cesium salts such as cesium chloride, cesium bromide, cesium formate, or a combination thereof), fibers, thixotropic additives, breakers, crosslinkers, rheology modifiers, curing accelerators, curing retarders, pH modifiers, chelating agents, scale inhibitors, enzymes, resins, water control materials, oxidizers, markers, Portland cement, pozzolana cement, gypsum cement, high alumina content cement, slag cement, silica cement, fly ash, metakaolin, shale, zeolite, a crystalline silica compound, amorphous silica, hydratable clays, microspheres, lime, or a combination thereof. In various embodiments, the curable composition or a mixture including the same can include one or more additive components such as: COLDTROL®, ATC®, OMC 2™, and OMC 42™ thinner additives; RHEMOD™ viscosifier and suspension agent; TEMPERUS™ and VIS-PLUS® additives for providing temporary increased viscosity; TAU-MOD™ viscosifying/suspension agent; ADAPTA®, DURATONE® HT, THERMO TONE™, BDF™-366, and BDF™-454 filtration control agents; LIQUITONE™ polymeric filtration agent and viscosifier; FACTANT™ emulsion stabilizer; LE SUPERMUL™, EZ MUL® NT, and FORTI-MUL® emulsifiers; DRIL TREAT® oil wetting agent for heavy fluids; BARACARB® bridging agent; BAROID® weighting agent; BAROLIFT® hole sweeping agent; SWEEP-WATE® sweep weighting agent; BDF-508 rheology modifier; and GELTONE® II organophilic clay. In various embodiments, the curable composition or a mixture including the same can include one or more additive components such as: X-TEND® II, PAC™-R, PAC™-L, LIQUI-VIS® EP, BRINEDRIL-VIS™, BARAZAN®, N-VIS®, and AQUAGEL® viscosifiers; THERMA-CHEK®, N-DRIL™, N-DRIL™ HT PLUS, IMPERMEX®, FILTERCHEK™, DEXTRID®, CARBONOX®, and BARANEX® filtration control agents; PERFORMATROL®, GEM™, EZ-MUD®, CLAY GRABBER®, CLAYSEAL®, CRYSTAL-DRIL®, and CLAY SYNC™ II shale stabilizers; NXS-LUBE™, EP MUD-LUBE®, and DRIL-N-SLIDE™ lubricants; QUIK-THIN®, IRON-THIN™, and ENVIRO-THIN™ thinners; SOURSCAV™ scavenger; BARACOR® corrosion inhibitor; and WALL-NUT®, SWEEP-WATE®, STOPPIT™, PLUG-GIT®, BARACARB®, DUO-SQUEEZE®, BARO-FIBRE™, STEELSEAL®, and HYDRO-PLUG® lost circulation management materials. Any suitable proportion of the curable composition or mixture including the curable composition can include any optional component listed in this paragraph, such as about 0.001 wt % to about 99.999 wt %, about 0.01 wt % to about 99.99 wt %, about 0.1 wt % to about 99.9 wt %, about 20 to about 90 wt %, or about 0.001 wt % or less, or about 0.01 wt %, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99 wt %, or about 99.999 wt % or more of the curable composition or mixture.

A pill is a relatively small quantity (e.g., less than about 500 bbl, or less than about 200 bbl) of drilling fluid used to accomplish a specific task that the regular drilling fluid cannot perform. For example, a pill can be a high-viscosity pill to, for example, help lift cuttings out of a vertical wellbore. In another example, a pill can be a freshwater pill to, for example, dissolve a salt formation. Another example is a pipe-freeing pill to, for example, destroy filter cake and relieve differential sticking forces. In another example, a pill is a lost circulation material pill to, for example, plug a thief zone. A pill can include any component described herein as a component of a drilling fluid.

A cement fluid can include an aqueous mixture of at least one of cement and cement kiln dust. The curable composition including the curable resin and the organophilically-modified clay can form a useful combination with cement or cement kiln dust. The cement kiln dust can be any suitable cement kiln dust. Cement kiln dust can be formed during the manufacture of cement and can be partially calcined kiln feed that is removed from the gas stream and collected in a dust collector during a manufacturing process. Cement kiln dust can be advantageously utilized in a cost-effective manner since kiln dust is often regarded as a low value waste product of the cement industry. Some embodiments of the cement fluid can include cement kiln dust but no cement, cement kiln dust and cement, or cement but no cement kiln dust. The cement can be any suitable cement. The cement can be a hydraulic cement. A variety of cements can be utilized in accordance with embodiments of the present invention; for example, those including calcium, aluminum, silicon, oxygen, iron, or sulfur, which can set and harden by reaction with water. Suitable cements can include Portland cements, pozzolana cements, gypsum cements, high alumina content cements, slag cements, silica cements, and combinations thereof. In some embodiments, the Portland cements that are suitable for use in embodiments of the present invention are classified as Classes A, C, H, and G cements according to the American Petroleum Institute, *API Specification for Materials and Testing for Well Cements*, API Specification 10, Fifth Ed., Jul. 1, 1990. A cement can be generally included in the cementing fluid in an amount sufficient to provide the desired compressive strength, density, or cost. In some embodiments, the hydraulic cement can be present in the cementing fluid in an amount in the range of from 0 wt % to about 100 wt %, about 0 wt % to about 95 wt %, about 20 wt % to about 95 wt %, or about 50 wt % to about 90 wt %. A cement kiln dust can be present in an amount of at least about 0.01 wt %, or about 5 wt % to about 80 wt %, or about 10 wt % to about 50 wt %.

Optionally, other additives can be added to a cement or kiln dust-containing composition of embodiments of the present invention as deemed appropriate by one skilled in the art, with the benefit of this disclosure. Any optional ingredient listed in this paragraph can be either present or not present in the curable composition. For example, the curable composition can include fly ash, metakaolin, shale, zeolite, set retarding additive, surfactant, a gas, accelerators, weight reducing additives, heavy-weight additives, lost circulation materials, filtration control additives, dispersants, and combinations thereof. In some examples, additives can include crystalline silica compounds, amorphous silica, salts, fibers, hydratable clays, microspheres, pozzolan lime, thixotropic additives, combinations thereof, and the like.

In various embodiments, the curable composition or mixture can include a proppant, a resin-coated proppant, an encapsulated resin, or a combination thereof. A proppant is a material that keeps an induced hydraulic fracture at least partially open during or after a fracturing treatment. Proppants can be transported into the subterranean formation (e.g., downhole) to the fracture using fluid, such as fracturing fluid or another fluid. A higher-viscosity fluid can more effectively transport proppants to a desired location in a fracture, especially larger proppants, by more effectively keeping proppants in a suspended state within the fluid. Examples of proppants can include sand, gravel, glass beads, polymer beads, ground products from shells and seeds such as walnut hulls, and manmade materials such as ceramic proppant, bauxite, tetrafluoroethylene materials (e.g., TEFLON™ polytetrafluoroethylene), fruit pit materials, processed wood, composite particulates prepared from a binder and fine grade particulates such as silica, alumina, fumed silica, carbon black, graphite, mica, titanium dioxide, meta-silicate, calcium silicate, kaolin, talc, zirconia, boron, fly ash, hollow glass microspheres, and solid glass, or mixtures thereof. In some embodiments, the proppant can have an average particle size, wherein particle size is the largest dimension of a particle, of about 0.001 mm to about 3 mm, about 0.15 mm to about 2.5 mm, about 0.25 mm to about 0.43 mm, about 0.43 mm to about 0.85 mm, about 0.85 mm to about 1.18 mm, about 1.18 mm to about 1.70 mm, or about 1.70 to about 2.36 mm. In some embodiments, the proppant can have a distribution of particle sizes clustering around multiple averages, such as one, two, three, or four different average particle sizes. The curable composition or mixture can include any suitable amount of proppant, such as about 0.01 wt % to about 99.99 wt %, about 0.1 wt % to about 80 wt %, about 10 wt % to about 60 wt %, or about 0.01 wt % or less, or about 0.1 wt %, 1, 2, 3, 4, 5, 10, 15, 20, 30, 40, 50, 60, 70, 80, 85, 90, 91, 92, 93, 94, 95, 96, 97, 98, 99, about 99.9 wt %, or about 99.99 wt % or more.

System or Apparatus.

In various embodiments, the present invention provides a system. The system can be any suitable system that can use or that can be generated by use of an embodiment of the curable composition described herein in a subterranean formation, or that can perform or be generated by performance of a method for using the curable composition described herein. The system can include a curable composition including at least one of a curable organic resin and a thermosetting polymer. The curable composition can also include an organophilically-modified clay. The system can also include a subterranean formation including the curable composition therein. In some embodiments, the curable composition in the system can also include a downhole fluid, or the system can include a mixture of the curable composition and downhole fluid. In some embodiments, the system can include a tubular, and a pump configured to pump the curable composition into the subterranean formation through the tubular.

Various embodiments provide systems and apparatus configured for delivering the curable composition described herein to a subterranean location and for using the curable composition therein, such as for a cementing operation, a repair operation (e.g., remedial treatment), an abandonment operation, a consolidation operation, or a fracturing operation. In various embodiments, the system or apparatus can include a pump fluidly coupled to a tubular (e.g., any suitable type of oilfield pipe, such as pipeline, drill pipe, production tubing, and the like), with the tubular containing a composition including the curable resin and organophilically-modified clay described herein. In some embodiments, the system or apparatus can include a casing, wherein the curable composition is between the casing and the wellbore or between the casing and another casing prior to being allowed to set. The curable composition can be placed between the casing and the wellbore or between the casing and another casing in any suitable fashion, such as but pumping downhole and allowing the curable composition to flow up through the annulus, or by pumping from above into the annulus.

In some embodiments, the system can include a drill string disposed in a wellbore, with the drill string including a drill bit at a downhole end of the drill string. The system can also include an annulus between the drill string and the wellbore. The system can also include a pump configured to circulate the curable composition through the drill string, through the drill bit, and back above-surface through the annulus. In some embodiments, the system can include a fluid processing unit configured to process the curable composition exiting the annulus to generate a cleaned drilling fluid for recirculation through the wellbore.

The pump can be a high pressure pump in some embodiments. As used herein, the term "high pressure pump" will refer to a pump that is capable of delivering a fluid to a subterranean formation (e.g., downhole) at a pressure of about 1000 psi or greater. A high pressure pump can be used when it is desired to introduce the curable composition to a subterranean formation at or above a fracture gradient of the subterranean formation, but it can also be used in cases where fracturing is not desired. In some embodiments, the high pressure pump can be capable of fluidly conveying particulate matter, such as proppant particulates, into the subterranean formation. Suitable high pressure pumps will be known to one having ordinary skill in the art and can include floating piston pumps and positive displacement pumps.

In other embodiments, the pump can be a low pressure pump. As used herein, the term "low pressure pump" will refer to a pump that operates at a pressure of about 1000 psi or less. In some embodiments, a low pressure pump can be fluidly coupled to a high pressure pump that is fluidly coupled to the tubular. That is, in such embodiments, the low pressure pump can be configured to convey the curable composition to the high pressure pump. In such embodiments, the low pressure pump can "step up" the pressure of the curable composition before it reaches the high pressure pump.

In some embodiments, the systems or apparatuses described herein can further include a mixing tank that is upstream of the pump and in which the curable composition is formulated. In various embodiments, the pump (e.g., a low pressure pump, a high pressure pump, or a combination thereof) can convey the curable composition from the mixing tank or other source of the curable composition to the tubular. In other embodiments, however, the curable composition can be formulated offsite and transported to a worksite, in which case the curable composition can be introduced to the tubular via the pump directly from its shipping container (e.g., a truck, a railcar, a barge, or the like) or from a transport pipeline. In either case, the curable composition can be drawn into the pump, elevated to an appropriate pressure, and then introduced into the tubular for delivery to the subterranean formation.

FIG. 1 shows an illustrative schematic of systems and apparatuses that can deliver embodiments of the curable compositions of the present invention to a subterranean location, according to one or more embodiments. It should be noted that while FIG. 1 generally depicts a land-based system or apparatus, it is to be recognized that like systems and apparatuses can be operated in subsea locations as well. Embodiments of the present invention can have a different scale than that depicted in FIG. 1. As depicted in FIG. 1, system or apparatus 1 can include mixing tank 10, in which an embodiment of the curable composition can be formulated. The curable composition can be conveyed via line 12 to wellhead 14, where the curable composition enters tubular 16, with tubular 16 extending from wellhead 14 into subterranean formation 18. Upon being ejected from tubular 16, the curable composition can subsequently penetrate into subterranean formation 18. Pump 20 can be configured to raise the pressure of the curable composition to a desired degree before its introduction into tubular 16. It is to be recognized that system or apparatus 1 is merely exemplary in nature and various additional components can be present that have not necessarily been depicted in FIG. 1 in the interest of clarity. In some examples, additional components that can be present include supply hoppers, valves, condensers, adapters, joints, gauges, sensors, compressors, pressure controllers, pressure sensors, flow rate controllers, flow rate sensors, temperature sensors, and the like. Although not depicted in FIG. 1, at least part of the curable composition can, in some embodiments, flow back to wellhead 14 and exit subterranean formation 18.

It is also to be recognized that the disclosed composition can also directly or indirectly affect the various downhole or subterranean equipment and tools that can come into contact with the curable composition during operation. Such equipment and tools can include wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, and the like), logging tools and related telemetry equipment, actuators (e.g., electromechanical devices, hydromechanical devices, and the like), sliding sleeves, production sleeves, plugs, screens, filters, flow control devices (e.g., inflow control devices, autonomous inflow control devices, outflow control devices, and the like), couplings (e.g., electro-hydraulic wet connect, dry connect, inductive coupler, and the like), control lines (e.g., electrical, fiber optic, hydraulic, and the like), surveillance lines, drill bits and reamers, sensors or distributed sensors, downhole heat exchangers, valves and corresponding actuation devices, tool seals, packers, cement plugs, bridge plugs, and other wellbore isolation devices or components, and the like. Any of these components can be included in the systems and apparatuses generally described above and depicted in FIG. 1.

Composition for Treatment of a Subterranean Formation.

Various embodiments provide a composition for treatment of a subterranean formation. The curable composition can be any suitable composition that can be used to perform an embodiment of the method for treatment of a subterranean formation described herein. For example, the curable composition can include at least one of a curable organic resin and a thermosetting polymer. The curable composition includes an organophilically-modified clay. The curable organic resin can be an epoxy resin, such as an epoxy-amine resin or an epoxy-anhydride resin. The organophilically-modified clay can be an organophilically-modified montmorillonite clay. Various embodiments provide a cured product of an embodiment of a curable composition described herein.

In some embodiments, the curable composition further includes a downhole fluid. The downhole fluid can be any suitable downhole fluid. In some embodiments, the downhole fluid can be a cementing fluid, a fracturing fluid, an abandonment fluid, a consolidation fluid, or a remedial treatment fluid.

Method for Preparing a Composition for Treatment of a Subterranean Formation.

In various embodiments, the present invention provides a method for preparing a composition for treatment of a subterranean formation. The method can be any suitable method that produces a composition described herein. For example, the method can include forming a curable composition including at least one of a curable organic resin and a thermosetting polymer, and also including an organophilically-modified clay.

EXAMPLES

Various embodiments of the present invention can be better understood by reference to the following Examples which are offered by way of illustration. The present invention is not limited to the Examples given herein.

Example 1

Figure 2:
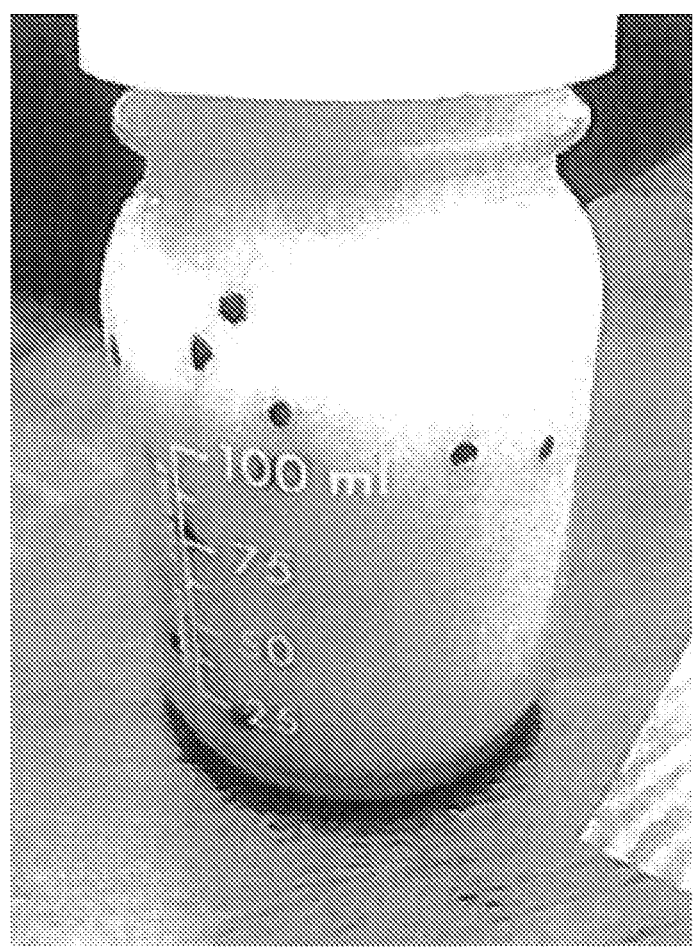
FIG. 2 illustrates a suspension of proppant in a curable composition that includes an organophilically-modified clay, in accordance with various embodiments.

The ability of organically modified clays to modify rheological properties was investigated using Nanomer® I.28E Nanoclay (NI28E) from Nanocor Inc., a wholly owned subsidiary of AMCOL International Corporation, Hoffman Estates, IL, which included about 25-30 wt % of trimethyl steryl ammonium ion, had a density of about 200 to about 500 kg/m$^3$, and had an average particle size of about 8-10 microns. The rheologies of the epoxy resin system including C1 (about 60 wt % to about 90 wt % diglycidyl ether of bisphenol A and about 10 wt % to about 30 wt % butyl glycidyl ether), C2 (cyclohexanedimethanol diglycidyl ether), and C3 (diethyltoluenediamine), and the organophilically-modified clay were investigated using a FANN® 35 rheometer with a Fann yield stress adapter (FYSA) attachment. Results are presented in Table 1. In each case where the organophilically-modified clay was used a yield point (YP) was observed in the rheological profile. In addition, the ability of the resulting epoxy resin system/clay mixture to suspend large size particles is shown in FIG. 2.

TABLE 1

Rheologies of resin/organophilically-modified clay systems. The measurement of 439+ was at the maximum extremity of the apparatus.

| | | | | |
|---|---|---|---|---|
| Test temperature (° F.) | 80 | 80 | 180 | 180 |
| C1 (g) | 200 | 200 | 200 | 200 |
| C2 (g) | 66.6 | 66.6 | 66.6 | 66.6 |
| C3 (g) | 77.4 | 77.4 | 77.4 | 77.4 |
| Nanomer ® I.28E (g) | 0 | 50 | 0 | 50 |
| Shear Stress at 182.4 1/s (lbf/100 ft$^2$) | 160 | 439+ | 35 | 88 |
| Shear Stress at 91.2 1/s (lbf/100 ft$^2$) | 78 | 280 | 13 | 59 |
| Shear Stress at 60.8 1/s (lbf/100 ft$^2$) | 54 | 212 | 7 | 51 |
| Shear Stress at 30.4 1/s (lbf/100 ft$^2$) | 28 | 138 | 3 | 38 |
| Shear Stress at 1.8 1/s (lbf/100 ft$^2$) | 3 | 45 | 0 | 20 |
| Shear Stress at 0.9 1/s (lbf/100 ft$^2$) | 1 | 40 | 0 | 18 |

TABLE 1-continued

Rheologies of resin/organophilically-modified clay systems. The measurement of 439+ was at the maximum extremity of the apparatus.

| | | | | |
|---|---|---|---|---|
| 3D-3 rpm decay | 0 | 17 | 0 | 9 |
| 6D-6 rpm decay | 0 | 17 | 0 | 9 |
| K1 | 0.304 | 0.304 | 0.304 | 0.304 |
| K2 | 0.701 | 0.701 | 0.701 | 0.701 |
| PV (cP) | 414 | 1054 | 92 | 180 |
| YP (lb/100 ft$^2$) | 1 | 57 | 2 | 22 |
| FYSA direct YP (lbf/100 ft$^2$) | 0 | 25 | 0 | 13 |

Example 2

Figure 3:
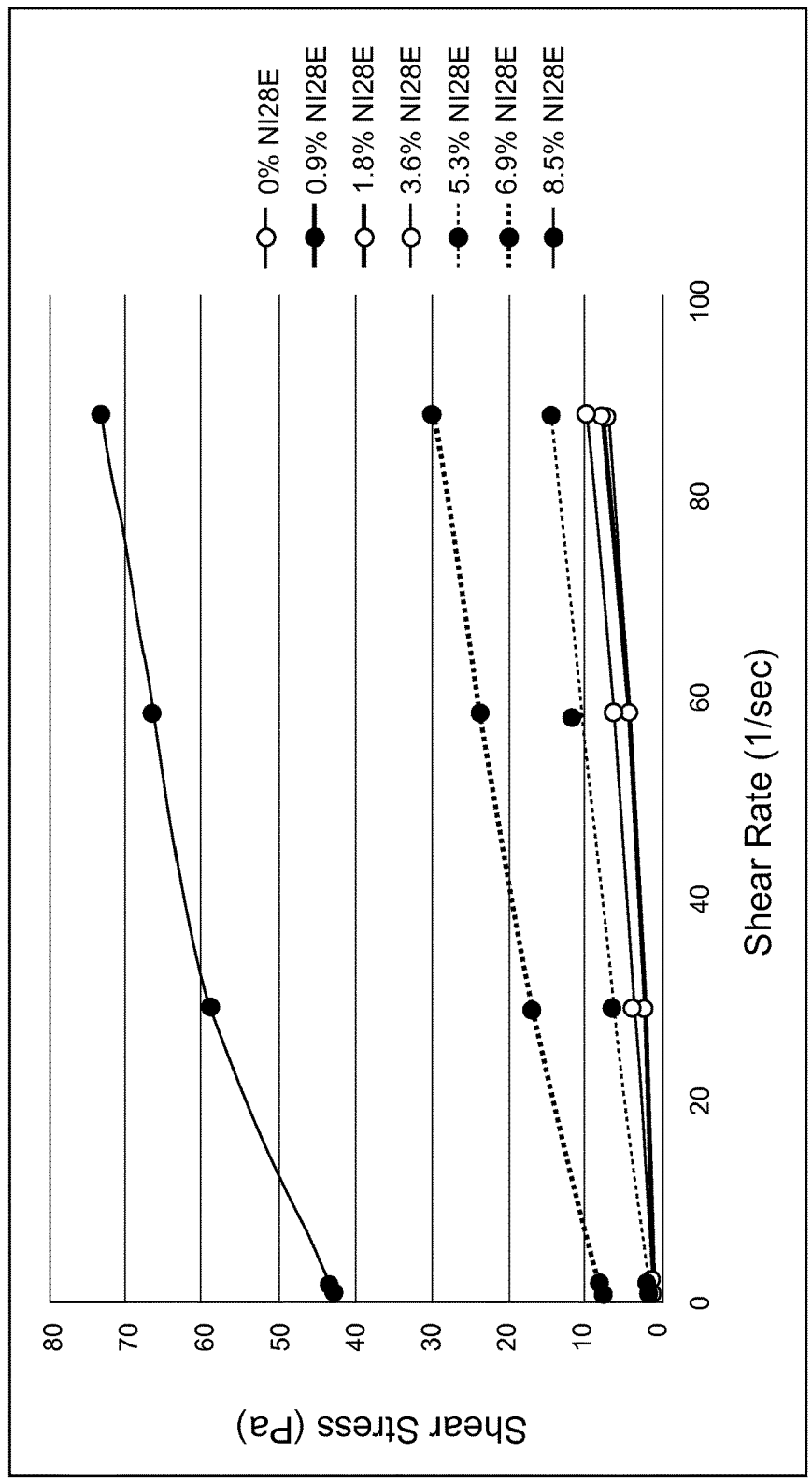
FIG. 3 illustrates shear stress versus shear rate for various compositions, in accordance with various embodiments.
Figure 4:
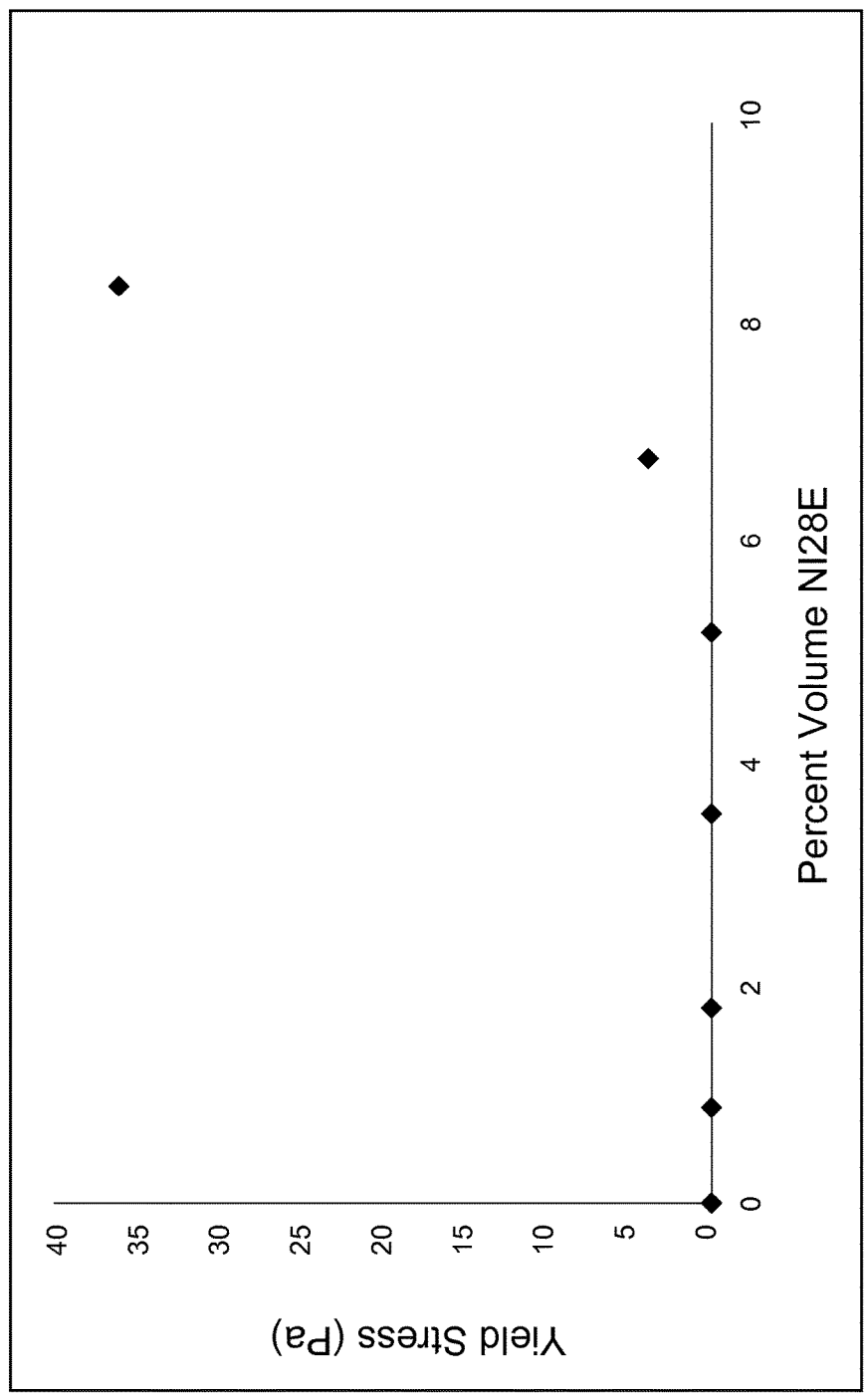
FIG. 4 illustrates yield stress versus percent volume of organically modified clay for various compositions, in accordance with various embodiments.

The ability of organically modified clays to modify rheological properties was further investigated using the NI28E of Example 1. The rheologies of the epoxy resin system including C2, C4 (polyoxypropylene diamine), C5 (2,4,6 tridimethylaminomethyl phenol) and the organophilically-modified clay were investigated using a FANN® 35 rheometer with a Fann yield stress adapter (FYSA) attachment. The curable organic composition was composed of 500 g C2, 224 g C4, 10 g of C5, and varying amounts of NI28E. FIG. 3 illustrates shear stress versus shear rate for the compositions tested. FIG. 4 illustrates yield stress versus the percent volume of NI28E. All percentages are expressed as percent volume. In FIG. 4 it was observed that a yield stress was imparted between a percent volume of NI28E between 5.3 to 6.9.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of embodiments of the present invention.

Additional Embodiments

The following exemplary embodiments are provided, the numbering of which is not to be construed as designating levels of importance:

Embodiment 1 provides a method of treating a subterranean formation, the method comprising:

placing in a subterranean formation a curable composition comprising at least one of a curable organic resin and a thermosetting polymer; and an organophilically-modified clay.

Embodiment 2 provides the method of Embodiment 1, wherein the method further comprises obtaining or providing the curable composition, wherein the obtaining or providing of the curable composition occurs above-surface.

Embodiment 3 provides the method of any one of Embodiments 1-2, wherein the method further comprises obtaining or providing the curable composition, wherein the obtaining or providing of the curable composition occurs in the subterranean formation.

Embodiment 4 provides the method of any one of Embodiments 1-3, wherein the method comprises at least one of cementing and repairing a wellbore in the subterranean formation.

Embodiment 5 provides the method of any one of Embodiments 1-4, wherein the method comprises consolidating the subterranean formation.

Embodiment 6 provides the method of any one of Embodiments 1-5, wherein the method comprises fracturing the subterranean formation.

Embodiment 7 provides the method of any one of Embodiments 1-6, wherein the method comprises performing an abandonment procedure on a well in the subterranean formation.

Embodiment 8 provides the method of any one of Embodiments 1-7, further comprising organophilically modifying a clay to provide the organophilically-modified clay.

Embodiment 9 provides the method of Embodiment 8, wherein the organophilic modification occurs at least partially above-surface.

Embodiment 10 provides the method of Embodiment 8, wherein the organophilic modification occurs at least partially in the subterranean formation.

Embodiment 11 provides the method of any one of Embodiments 1-9, further comprising curing the curable composition, to provide a cured product of the curable composition.

Embodiment 12 provides the method of Embodiment 11, wherein the curing occurs at least partially above-surface.

Embodiment 13 provides the method of any one of Embodiments 11-12, wherein the curing occurs at least partially in the subterranean formation.

Embodiment 14 provides the method of any one of Embodiments 1-13, wherein the curable composition comprises a hydrophobic curable composition.

Embodiment 15 provides the method of any one of Embodiments 1-14, wherein about 1 wt % to about 99.99 wt % of the curable composition is the curable organic resin, the thermosetting polymer, or a combination thereof.

Embodiment 16 provides the method of any one of Embodiments 1-15, wherein the curable organic resin or the thermosetting polymer comprises at least one of a shellac, a polyamide, a silyl-modified polyamide, a polyester, a polycarbonate, a polycarbamate, a urethane, a natural resin, an epoxy-based resin, a furan-based resin, a phenolic-based resin, a urea-aldehyde resin, and a phenol-phenol formaldehyde-furfuryl alcohol resin.

Embodiment 17 provides the method of any one of Embodiments 1-16, wherein the curable organic resin comprises at least one of an epoxy-amine and an epoxy-anhydride resin.

Embodiment 18 provides the method of any one of Embodiments 1-17, wherein the curable organic resin comprises at least one epoxide component that is a polyepoxide-substituted mono- or poly($C_5$-$C_{20}$)aryl compound, wherein the ($C_5$-$C_{20}$)aryl is substituted or unsubstituted.

Embodiment 19 provides the method of Embodiment 18, wherein the epoxide component is a diepoxide-substituted phenyl($C_1$-$C_{10}$)hydrocarbylphenyl, wherein the phenyl and ($C_1$-$C_{10}$)hydrocarbyl are each independently substituted or unsubstituted.

Embodiment 20 provides the method of any one of Embodiments 18-19, wherein the epoxide component is diglycidyl ether of bisphenol A.

Embodiment 21 provides the method of any one of Embodiments 1-20, wherein the curable organic resin comprises at least one epoxide component that is a polyepoxide-substituted ($C_5$-$C_{20}$)cycloalkyl compound, wherein the ($C_5$-$C_{20}$)cycloalkyl is substituted or unsubstituted.

Embodiment 22 provides the method of Embodiment 21, wherein the epoxide component is cyclohexanedimethanol diglycidyl ether.

Embodiment 23 provides the method of any one of Embodiments 1-22, wherein the curable composition comprises least one amine component that is a polyamine-substituted ($C_1$-$C_{30}$)hydrocarbyl, wherein the ($C_1$-$C_{30}$)hydrocarbyl and each amine are independently substituted or unsubstituted.

Embodiment 24 provides the method of Embodiment 23, wherein the amine component is a bis(amino($C_0$-C5)hydrocarbyl)($C_6$-$C_{20}$)aryl compound, wherein the ($C_6$-$C_{20}$)aryl, ($C_0$-C5)hydrocarbyl, and each amine are each independently substituted or unsubstituted.

Embodiment 25 provides the method of any one of Embodiments 23-24, wherein the amine component is diethyltoluenediamine.

Embodiment 26 provides the method of any one of Embodiments 1-25, wherein the curable composition comprises at least one amine component that is a polyamine-substituted poly(($C_2$-$C_5$)hydrocarbyloxy), wherein each ($C_2$-$C_5$)hydrocarbyloxy and each amine are independently substituted or unsubstituted.

Embodiment 27 provides the method of Embodiment 26, wherein the amine component is polyoxypropylene diamine.

Embodiment 28 provides the method of any one of Embodiments 1-27, wherein the curable composition comprises an amine component that is a mono- or polyamino ($C_0$-$C_{10}$)hydrocarbyl($C_6$-$C_{20}$)aryl, wherein the ($C_0$-$C_{10}$)hydrocarbyl, ($C_6$-$C_{20}$)aryl, and each amine are each independently substituted or unsubstituted.

Embodiment 29 provides the method of Embodiment 28, wherein the amine component is a tris(amino($C_1$-$C_3$)hydrocarbyl)benzene, wherein the ($C_1$-$C_3$)hydrocarbyl, the benzene, and each amine are independently substituted or unsubstituted.

Embodiment 30 provides the method of any one of Embodiments 28-29, wherein the amine component is 2,4,6-tris(dimethylaminomethyl)phenol.

Embodiment 31 provides the method of any one of Embodiments 1-30, wherein the curable composition comprises an anhydride component that is a maleic anhydride or a succinic anhydride that is fused with a substituted or unsubstituted ($C_5$-$C_{20}$)hydrocarbon ring, or a plurality of said fused maleic or succinic anhydrides linked together via a substituted or unsubstituted ($C_0$-$C_{30}$)hydrocarbyl interrupted by 0, 1, 2, or 3 oxygen atoms.

Embodiment 32 provides the method of Embodiment 31, wherein the anhydride component is at least one of bisphenol A dianhydride, biphenyl dianhydride, benzophenone-3,3',4,4'-tetracarboxylic dianhydride, methyl-5-norbornene-2,3-dicarboxylic anhydride, methyltetrahydrophthalic anhydride, and methylhexahydrophthalic anhydride Embodiment 33 provides the method of any one of Embodiments 1-32, wherein the organophilically-modified clay is present in the curable composition at a concentration such that the curable composition has a higher yield point than a corresponding curable composition having substantially none of the organophilically-modified clay therein.

Embodiment 34 provides the method of any one of Embodiments 1-33, wherein the organophilically-modified clay is about 0.01 wt % to about 50 wt % of the curable composition.

Embodiment 35 provides the method of any one of Embodiments 1-34, wherein the organophilically-modified clay is about 1 wt % to about 20 wt % of the curable composition.

Embodiment 36 provides the method of any one of Embodiments 1-35, wherein the organophilically-modified clay comprises at least one of kaolinite, montmorillonite, illite, and chlorite.

Embodiment 37 provides the method of any one of Embodiments 1-36, wherein the organophilically-modified clay comprises montmorillonite.

Embodiment 38 provides the method of any one of Embodiments 1-37, wherein the organophilically-modified clay comprises an organophilic-modification that is at least one of cationic substitution, physisorption, and chemisorption.

Embodiment 39 provides the method of any one of Embodiments 1-38, wherein at least one organophilic-modification compound or an ion thereof is about 0.01 wt % to about 80 wt % of the organophilically-modified clay.

Embodiment 40 provides the method of any one of Embodiments 1-39, wherein at least one organophilic-modification compound or an ion thereof is about 10 wt % to about 50 wt % of the at least one organophilically-modified clay.

Embodiment 41 provides the method of any one of Embodiments 1-30, wherein the organophilically-modified clay comprises at least one organophilic-modification compound or an ion thereof, wherein the organophilic-modification compound is at least one of a substituted or unsubstituted ($C_{10}$-$C_{50}$) fatty acid or a salt thereof, a tri- or tetra-($C_1$-$C_{50}$)hydrocarbylammonium salt, and a tri- or tetra-($C_1$-$C_{50}$)hydrocarbylphosphonium salt, wherein each ($C_1$-$C_{50}$)hydrocarbyl is independently selected, is substituted or unsubstituted, and is interrupted by 0, 1, 2, or 3 atoms chosen from —O—, —S—, and substituted or unsubstituted —NH—.

Embodiment 42 provides the method of Embodiment 41, wherein the organophilic-modification compound comprises a ($C_{10}$-$C_{50}$) fatty acid salt.

Embodiment 43 provides the method of any one of Embodiments 41-42, wherein the organophilic-modification compound comprises magnesium stearate and zinc stearate.

Embodiment 44 provides the method of any one of Embodiments 41-43, wherein the organophilic-modification compound comprises at least one of a tri- or tetra-($C_1$-$C_{50}$) hydrocarbylammonium salt, and a tri- or tetra-($C_1$-$C_{50}$) alkyl- or alkenylphosphonium salt, wherein each ($C_1$-$C_{50}$) hydrocarbyl is independently selected.

Embodiment 45 provides the method of any one of Embodiments 41-44, wherein the organophilic-modification compound comprises at least one of a trimethyl stearyl ammonium salt, dodecyltrimethylammonium bromide, hexadecyltrimethylammonium bromide, tetradecyltrimethylammonium bromide, and tetraphenylphosphonium bromide.

Embodiment 46 provides the method of any one of Embodiments 1-45, wherein the organophilically-modified clay has a density of about 50 kg/m$^3$ to about 5,000 kg/m$^3$.

Embodiment 47 provides the method of any one of Embodiments 1-46, wherein the organophilically-modified clay has a density of about 200 kg/m$^3$ to about 500 kg/m$^3$.

Embodiment 48 provides the method of any one of Embodiments 1-47, wherein the organophilically-modified clay has a particle size of about 1 nm to about 1 mm.

Embodiment 49 provides the method of any one of Embodiments 1-48, wherein the organophilically-modified clay has a particle size of about 1 micron to about 500 microns.

Embodiment 50 provides the method of any one of Embodiments 1-49, wherein the curable composition further comprises a weighting agent.

Embodiment 51 provides the method of Embodiment 50, wherein the weighting agent is about 0.001 wt % to about 80 wt % of the curable composition.

Embodiment 52 provides the method of Embodiment 50, wherein the weighting agent has a particle size of about 1 nm to about 10 mm.

Embodiment 53 provides the method of any one of Embodiments 1-52, wherein the curable composition has a yield point of about 1 lbf/100 ft$^2$ to about 10,000 lbf/100 ft$^2$.

Embodiment 54 provides the method of any one of Embodiments 1-53, wherein the curable composition has a yield point of about 15 lbf/100 ft$^2$ to about 100 lbf/100 ft$^2$.

Embodiment 55 provides the method of any one of Embodiments 1-54, wherein the curable composition has a shear stress, at about 10° C. to about 40° C. and standard pressure, at about 0.5 s$^-$ to about 50 s$^-$ of about 10 lbf/100 ft$^2$ to about 300 lbf/100 ft$^2$.

Embodiment 56 provides the method of any one of Embodiments 1-55, wherein the curable composition has a shear stress, at about 50° C. to about 100° C. and standard pressure, at about 0.5 to about 50 s$^-$ of about 10 lbf/100 ft$^2$ to about 100 lbf/100 ft$^2$.

Embodiment 57 provides the method of any one of Embodiments 1-56, wherein the curable composition has a density of about 50 kg/m$^3$ to about 5,000 kg/m$^3$.

Embodiment 58 provides the method of any one of Embodiments 1-57, wherein the curable composition has a density of about 200 kg/m$^3$ to about 3,000 kg/m$^3$.

Embodiment 59 provides the method of any one of Embodiments 1-58, wherein the curable composition further comprises water, saline, aqueous base, oil, organic solvent, synthetic fluid oil phase, aqueous solution, alcohol or polyol, cellulose, starch, alkalinity control agent, acidity control agent, density control agent, density modifier, emulsifier, dispersant, polymeric stabilizer, crosslinking agent, polyacrylamide, polymer or combination of polymers, antioxidant, heat stabilizer, foam control agent, solvent, diluent, plasticizer, filler or inorganic particle, pigment, dye, precipitating agent, rheology modifier, oil-wetting agent, set retarding additive, surfactant, corrosion inhibitor, gas, weight reducing additive, heavy-weight additive, lost circulation material, filtration control additive, salt, fiber, thixotropic additive, breaker, crosslinker, gas, rheology modifier, curing accelerator, curing retarder, pH modifier, chelating agent, scale inhibitor, enzyme, resin, water control material, polymer, oxidizer, a marker, Portland cement, pozzolana cement, gypsum cement, high alumina content cement, slag cement, silica cement, fly ash, metakaolin, shale, zeolite, a crystalline silica compound, amorphous silica, fibers, a hydratable clay, microspheres, pozzolan lime, or a combination thereof.

Embodiment 60 provides the method of any one of Embodiments 1-59, wherein the placing of the curable composition in the subterranean formation comprises fracturing at least part of the subterranean formation to form at least one subterranean fracture.

Embodiment 61 provides the method of any one of Embodiments 1-60, wherein the placing of the curable composition in the subterranean formation comprises pumping the curable composition through a tubular disposed in a wellbore and into the subterranean formation.

Embodiment 62 provides the method of any one of Embodiments 1-61, wherein the placing of the curable composition in the subterranean formation comprises pumping the curable composition through a casing disposed in a wellbore and into an annulus between the casing and the wellbore.

Embodiment 63 provides a system for performing the method of any one of Embodiments 1-62, the system comprising:
a tubular disposed in the subterranean formation; and
a pump configured to pump the curable composition in the subterranean formation through the tubular.

Embodiment 64 provides a method of treating a subterranean formation, the method comprising:
placing in a subterranean formation a curable composition comprising
a curable epoxy resin; and
an organophilically-modified montmorillonite clay.

Embodiment 65 provides a system comprising:
a curable composition comprising
at least one of a curable organic resin and a thermosetting polymer; and
an organophilically-modified clay; and
a subterranean formation comprising the curable composition therein.

Embodiment 66 provides the system of Embodiment 65, further comprising
a tubular disposed in the subterranean formation; and
a pump configured to pump the curable composition in the subterranean formation through the tubular.

Embodiment 67 provides a curable composition for treatment of a subterranean formation, the curable composition comprising:
at least one of a curable organic resin and a thermosetting polymer; and
an organophilically-modified clay.

Embodiment 68 provides the curable composition of Embodiment 67, wherein the curable composition further comprises a downhole fluid.

Embodiment 69 provides a method of preparing a curable composition for treatment of a subterranean formation, the method comprising:
forming a curable composition comprising
at least one of a curable organic resin and a thermosetting polymer; and
an organophilically-modified clay.

Embodiment 70 provides the composition, method, or system of any one or any combination of Embodiments 1-69 optionally configured such that all elements or options recited are available to use or select from.

What is claimed is:
1. A method of treating a subterranean formation, the method comprising:
placing a curable composition in a subterranean formation, wherein the curable composition comprises:
at least one of a curable organic resin and a thermosetting polymer; and
an organophilically-modified clay comprising an organophilic-modification compound or an ion thereof,
wherein the organophilic-modification compound is at least one of a substituted or unsubstituted ($C_{10}$-$C_{50}$) fatty acid or a salt thereof, a tri- or tetra-($C_1$-$C_{50}$) hydrocarbylammonium salt, a tri- or tetra-($C_1$-$C_{50}$) hydrocarbylphosphonium salt, or combinations thereof, and
wherein each tri- or tetra-($C_1$-$C_{50}$) hydrocarbylammonium salt, and tri- or tetra-($C_1$-$C_{50}$) hydrocarbylphosphonium salt is independently selected, is substituted or unsubstituted, and is interrupted by 0, 1, 2, or 3 atoms chosen from at least one of —O—, —S—, substituted or unsubstituted —NH—, or combinations thereof.

2. The method of claim 1, wherein the organophilic-modification compound comprises a ($C_{10}$-$C_{50}$) fatty acid salt.

3. The method of claim 1, wherein the organophilic-modification compound comprises magnesium stearate and zinc stearate.

4. The method of claim 1, wherein the organophilic-modification compound comprises at least one of a tri- or tetra-($C_1$-$C_{50}$) hydrocarbylammonium salt, a tri- or tetra-($C_1$-$C_{50}$)alkyl- or alkenylphosphonium salt, or a combination thereof.

5. The method of claim 1, wherein the organophilic-modification compound comprises at least one of a trimethyl stearyl ammonium salt, dodecyltrimethylammonium bromide, hexadecyltrimethylammonium bromide, tetradecyltrimethylammonium bromide, tetraphenylphosphonium bromide, or combinations thereof.

6. The method of claim 1, wherein the curable composition comprises an amine component that is at least one of diethyltoluenediamine, polyoxypropylene diamine, 2,4,6-tris(dimethylaminomethyl)phenol, or any combination thereof.

7. The method of claim 1, further comprising curing the curable composition, to provide a cured product of the curable composition, wherein the curing occurs at least partially above-surface.

8. The method of claim 1, further comprising curing the curable composition, to provide a cured product of the curable composition, wherein the curing occurs at least partially in the subterranean formation.

9. The method of claim 1, wherein the curable organic resin comprises a diepoxide-substituted phenyl($C_1$-$C_{10}$) hydrocarbylphenyl, wherein the phenyl and ($C_1$-$C_{10}$) hydrocarbyl are each independently substituted or unsubstituted.

10. The method of claim 1, wherein the curable organic resin comprises diglycidyl ether of bisphenol A, cyclohexanedimethanol diglycidyl ether, or a combination thereof.

11. The method of claim 1, wherein the organophilically-modified clay has a density of about 200 kg/m$^3$ to about 500 kg/m$^3$.

12. The method of claim 1, wherein the organophilically-modified clay has a particle size of about 1 micron to about 500 microns.

13. The method of claim 1, wherein at least one organophilic-modification compound or an ion thereof is about 10 wt % to about 50 wt % of the at least one organophilically-modified clay.

14. The method of claim 1, wherein the curable composition has a density of about 200 kg/m$^3$ to about 3,000 kg/m$^3$.

15. The method of claim 1, wherein the organophilically-modified clay is about 1 wt % to about 20 wt % of the curable composition.

16. The method of claim 1, wherein the organophilically-modified clay comprises at least one of kaolinite, montmorillonite, illite, and chlorite.

17. The method of claim 1, further comprising fracturing at least part of the subterranean formation with the curable composition to form at least one subterranean fracture.

18. The method of claim 1, further comprising cementing or repairing a wellbore in the subterranean formation.

19. A system for performing the method of claim 1, the system comprising:
- a tubular disposed in the subterranean formation; and
- a pump configured to pump the curable composition in the subterranean formation through the tubular.

20. A curable composition for treatment of a subterranean formation, composition comprising:
- at least one of a curable organic resin and a thermosetting polymer; and
- an organophilically-modified clay comprising an organophilic-modification compound or an ion thereof,
- wherein the organophilic-modification compound is at least one of a substituted or unsubstituted $(C_{10}-C_{50})$ fatty acid or a salt thereof, a tri- or tetra-$(C_1-C_{50})$ hydrocarbylammonium salt, a tri- or tetra-$(C_1-C_{50})$ hydrocarbylphosphonium salt, or combinations thereof, and
- wherein each tri- or tetra-$(C_1-C_{50})$ hydrocarbylammonium salt, and tri- or tetra-$(C_1-C_{50})$ hydrocarbylphosphonium salt is independently selected, is substituted or unsubstituted, and is interrupted by 0, 1, 2, or 3 atoms chosen from at least one of —O—, —S—, substituted or unsubstituted —NH—, or combinations thereof.

* * * * *